(12) United States Patent
Smith et al.

(10) Patent No.: US 11,757,774 B1
(45) Date of Patent: Sep. 12, 2023

(54) MULTI-CHANNEL COMMUNICATION

(71) Applicant: Cable Television Laboratories, Inc., Louisville, CO (US)

(72) Inventors: Luther E. Smith, Fort Lupton, CO (US); Jonathan Ray Dennis, Aurora, CO (US); Aaron Quinto, Erie, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 17/732,182

(22) Filed: Apr. 28, 2022

Related U.S. Application Data

(63) Continuation-in-part of application No. 17/098,323, filed on Nov. 13, 2020, now abandoned, which is a continuation-in-part of application No. 15/918,532, filed on Mar. 12, 2018, now Pat. No. 11,323,359.

(60) Provisional application No. 62/934,660, filed on Nov. 13, 2019, provisional application No. 62/542,437, filed on Aug. 8, 2017.

(51) Int. Cl.
*H04L 45/64* (2022.01)
*H04L 45/7452* (2022.01)
*H04L 49/351* (2022.01)
*H04W 40/24* (2009.01)
*H04L 45/243* (2022.01)

(52) U.S. Cl.
CPC ............ *H04L 45/64* (2013.01); *H04L 45/243* (2022.05); *H04L 45/7452* (2022.05); *H04L 49/351* (2013.01); *H04W 40/24* (2013.01)

(58) Field of Classification Search
CPC ... H04L 45/64; H04L 45/243; H04L 45/7452; H04L 49/00; H04L 49/351; H04W 40/24; H04W 40/00; H04W 40/34; H04W 36/0069
See application file for complete search history.

(56) References Cited

U.S. PATENT DOCUMENTS

| | | |
|---|---|---|
| 9,838,923 B1 | 12/2017 | Sitton et al. |
| 10,051,688 B1 * | 8/2018 | Huang .................... H04L 61/58 |
| 10,075,387 B1 | 9/2018 | Avasol |
| 10,244,536 B1 | 3/2019 | Jiang et al. |
| 2003/0210663 A1 | 11/2003 | Everson et al. |
| 2006/0270339 A1 | 11/2006 | Mahany |
| 2008/0219281 A1 | 9/2008 | Akin et al. |

(Continued)

OTHER PUBLICATIONS

IEEE Std 802.11-2012 "Part 11: Wireless LAN Medium Access Control (MAC) and Physical Layer (PHY) Specifications" (Year: 2012).

(Continued)

*Primary Examiner* — Mohamed A Kamara
(74) *Attorney, Agent, or Firm* — Cozen O'Connor

(57) ABSTRACT

Systems and methods implement multi-channel communication by remapping Ethernet frames. An Ethernet frame is captured leaving a first bridge of an Ethernet switch. A destination address of the Ethernet frame is matched to a remap rule and to a filter defined for the remap rule. The destination address of the Ethernet frame is updated based upon the remap rule, and the Ethernet frame is output to an Ethernet port corresponding to the updated destination address of the Ethernet frame. The remap rule and the filter allow the Ethernet switch to route traffic at an OSI model layer-4 level.

20 Claims, 16 Drawing Sheets

(56) References Cited

U.S. PATENT DOCUMENTS

| | | |
|---|---|---|
| 2008/0285553 A1 | 11/2008 | Abdulla et al. |
| 2009/0135829 A1* | 5/2009 | Zheng .................. H04L 61/103 370/395.1 |
| 2012/0052900 A1 | 3/2012 | Liu et al. |
| 2012/0057511 A1 | 3/2012 | Sivakumar et al. |
| 2013/0077554 A1 | 3/2013 | Gauvreau et al. |
| 2013/0235884 A1 | 9/2013 | Mamidwar et al. |
| 2015/0071287 A1* | 3/2015 | Berman .................. H04L 45/72 370/392 |
| 2015/0208451 A1 | 7/2015 | Tzoreff et al. |
| 2015/0289299 A1 | 10/2015 | Abraham et al. |
| 2015/0372917 A1 | 12/2015 | Biswas et al. |
| 2016/0142365 A1* | 5/2016 | Devarajan ............... H04L 45/74 370/392 |
| 2016/0212755 A1 | 7/2016 | Cao et al. |
| 2016/0249267 A1 | 8/2016 | Ho et al. |
| 2017/0245297 A1 | 8/2017 | Wild et al. |
| 2018/0234335 A1 | 8/2018 | Sridhar et al. |
| 2018/0270143 A1 | 9/2018 | Currivan et al. |
| 2018/0351867 A1 | 12/2018 | Dhanabalan et al. |

OTHER PUBLICATIONS

Traffic Separation Using Dual Wi-Fi Interface to Enhance WLAN System Throughput, Takayuki Nishio, Ryo Nishioka, Masahiro Morikura and Koji Yamamota, IEEE 2014.

* cited by examiner

MULTI-CHANNEL COMMUNICATION

RELATED APPLICATIONS

This application is a continuation-in-part of U.S. patent application Ser. No. 17/098,323, titled "Multi-Channel Communication," filed Nov. 13, 2020, which claims priority to U.S. Provisional Patent Application Ser. No. 62/934,660, filed Nov. 13, 2019, and is a continuation-in-part of U.S. patent application Ser. No. 15/918,532, filed Mar. 12, 2018, which claims priority to U.S. Patent Application Ser. No. 62/542,437 filed Aug. 8, 2017. The subject matter of all of these applications is incorporated herein by reference in their entireties.

FIELD OF THE INVENTION

The present embodiments relate to multi-channel communication of the type sufficient to facilitate data delivery utilizing two or more wireless and/or wired channels/paths associated with an access point configured to facilitate communications with a plurality of devices.

BACKGROUND

An address remapper is a Linux kernel module which provides means of policy-based layer-2 traffic switching. In some examples, rules and filters may be defined that can rewrite a destination address (e.g., a destination MAC address) of matching outbound Ethernet frames. In some examples, the frames can be rerouted onto a different bridge interface in this way. Filters may be configured to catch traffic as high as layer-4. In some examples, an address remapper (e.g., a medium access control (MAC) address remapper) may be implemented according to various projects or guidelines, for example, being designed to meet the needs of the Dual-Channel Wi-Fi project. In another example, a Dual-Channel Wi-Fi client may have two Ethernet/Wi-Fi interfaces (e.g., eth0 and eth1), but only one IP (192.168.1.100) interface. Traffic destined for 192.168.1.100 may be transported either via eth0 or eth1 at a Dual-Channel Wi-Fi router's discretion. For example, Linux "ebtables" tools have been explored as a means of implementing this purpose, but these tools do not provide functionality required for this application. For example, the "ebtables" tools may provide only limited layer-3-level filtering whereas a MAC address remapper may provide the ability to statically filter frames as high as layer-4 (e.g. TCP/UDP). In addition to the higher-layer filtering, another requirement for this application is load balancing. When a client uses several Ethernet/Wi-Fi interfaces, a load-balancing policy and implementation will be required to process traffic destined for these endpoints.

SUMMARY

A method for an access point to facilitate dual channel communications may include: identifying downstream and upstream communication of network traffic for a first device over a primary channel of the access point; identifying downstream communication of network traffic for the first device over a secondary channel of the access point; and selecting respective portions of the network traffic information to be provided via the enabled downstream and upstream communications of network traffic based on an address of each of the respective portions; determining a remapping of the address for each of the of each of the respective portions; and communicating the respective portions of the network traffic information according to the determined remappings of each of the respectively selected portions.

Likewise, another method for an access point to facilitate dual channel communications may include: receiving downstream or upstream communication of network traffic for a first device over a plurality of channels; and transmitting or receiving the respective portions of the network traffic information to or from the first device.

In one embodiment, an Ethernet switch for multi-channel communication includes a processor, a first bridge, and memory storing non-transitory instructions that when executed by the processor cause the processor to: capture an Ethernet frame leaving a first bridge of the Ethernet switch; match a destination address of the Ethernet frame to a remap rule; match the Ethernet frame to a filter defined for the remap rule; generate an updated Ethernet frame from the Ethernet frame by updating the destination address based upon the remap rule; and output the updated Ethernet frame to an Ethernet port corresponding to the updated destination address of the Ethernet frame.

In another embodiment, a method for multi-channel communication includes capturing an Ethernet frame leaving a first bridge of an Ethernet switch. A destination address of the Ethernet frame is matched to a remap rule, and the Ethernet frame is matches to a filter defined for the remap rule. The destination address of the Ethernet frame is updated based upon the remap rule and the Ethernet frame is output to an Ethernet port corresponding to the updated destination address of the Ethernet frame.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings, wherein.

Figure 1:
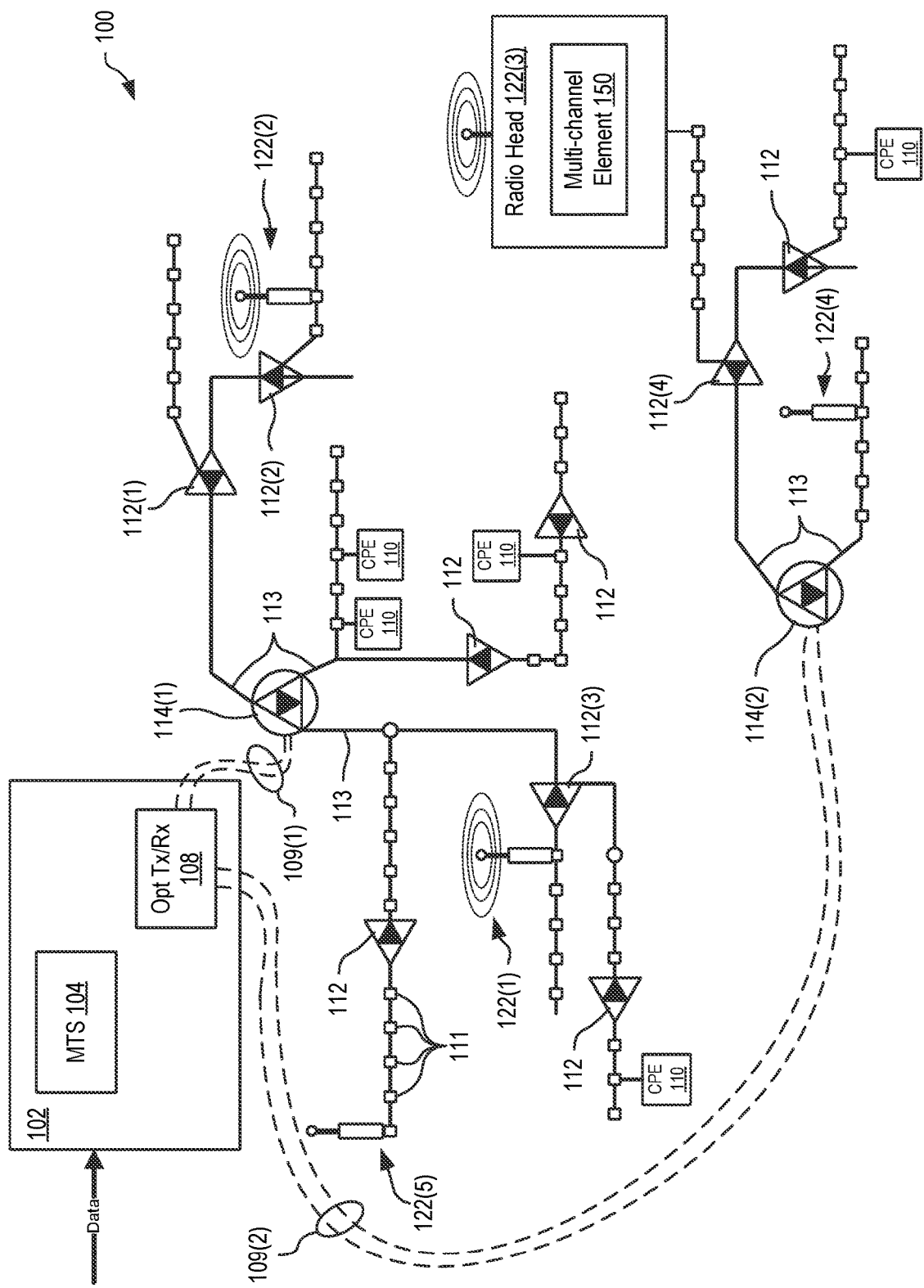
FIG. 1 is a schematic diagram illustrating one example multi-channel communications system, in an embodiment.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION OF THE EMBODIMENTS

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the term "database" may refer to either a body of data, a relational database management system (RDBMS), or to both, and may include a collection of data including hierarchical databases, relational databases, flat file databases, object-relational databases, object-oriented databases, and/or another structured collection of records or data that is stored in a computer system.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable and include computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time-of-occurrence of the associated events, the time-of-measurement and collection of predetermined data, the time for a computing device (e.g., a processor) to process the data, and the time of a system response to the events and the environment. In the embodiments described herein, these activities and events occur substantially instantaneously.

As used herein, unless specified to the contrary, "modem termination system," or "MTS'" may refer to one or more of a cable modem termination system (CMTS), an optical line terminal (OLT), a network termination unit, a satellite termination unit, a mobile core, a converged core such as a wireless-wireline converged core, and/or other termination devices and systems. Similarly, "modem" may refer to one or more of a cable modem (CM), an optical network unit (ONU), a digital subscriber line (DSL) unit/modem, a satellite modem, eNodeB, gNodeB, etc.

As used herein, the term "coherent transceiver," unless specified otherwise, may include, but is not limited to, to a P2P or P2MP coherent optics transceiver having a coherent optics transmitting portion and a coherent optics receiving portion. In some instances, the transceiver may refer to a specific device under test (DUT) for several of the embodiments described herein.

As described herein, a "PON" generally refers to a passive optical network or system having components labeled according to known naming conventions of similar elements that are used in conventional PON systems. For example, an OLT may be implemented at an aggregation point, such as a headend/hub, and multiple ONUs may be disposed and operable at a plurality of end user, customer premises, or subscriber locations. Accordingly, an "uplink transmission" refers to an upstream transmission from an end user to a headend/hub, and a "downlink transmission" refers to a downstream transmission from a headend/hub to the end user, which may be presumed to be generally broadcasting continuously (unless in a power saving mode, or the like).

The embodiments described herein provide innovative access network architectures and processes that are useful for modifying and re-routing Ethernet and Wi-Fi traffic, thus providing relative improvements in throughput, latency, and thus power consumption and other like efficiencies. Likewise, the embodiments described herein provide innovative access network architectures and processes that allow an operator to deploy more advanced services (e.g., DOCSIS related symmetric 10 Gigabit/sec (10G) services, 3rd Generation Partnership Project (3GPP) related 5th Generation (5G) and/or New Radio (NR) services, etc.) to customers, for example, while also doing so relatively more quickly and relatively more cheaply.

The disclosed embodiments are merely exemplary, and other embodiments may have various and alternative forms. The figures are not necessarily to scale; some features may be exaggerated or minimized to show details of particular components. Therefore, specific structural and functional details disclosed herein are not to be interpreted as limiting, but merely as a representative. The MAC Address Remapper is a Linux kernel module which provides means of policy-based layer-2 traffic switching. Rules and filters can be defined which can rewrite the destination MAC address of matching outbound Ethernet frames; optionally the frames can be rerouted onto a different bridge interface. Filters can be configured to catch traffic as high as layer-4. Eventually it is anticipated that the MAC Address Remapper will also support load-balancing.

FIG. 1 is a schematic diagram illustrating one example multi-channel communications system 100, in an embodiment. Although the multi-channel communications system 100 is shown as a cable communication network, other communication networks may benefit from the present embodiments, including a DSL network, a backhaul network for a wireless small cell network, an optical network, a wireless or mobile network, a combination of these, and so on. The multi-channel communications system 100 includes a headend 102 in optical communication, via an optical transceiver 108 and optical fibers 109(1) and 109(2), with optical nodes 114(1) and 114(2) (also called "fiber nodes"), respectively. The headend 102 may also include a modem termination system (MTS) 104.

Each optical node 114 is coupled via connection 113 (e.g., coaxial line cables, which may be, for example, aerial or underground, although wireless connections are also contemplated, e.g., 3GPP or IEEE defined wireless connections) to one or more of a tap 111, a radio frequency (RF) radio head 122, and an amplifiers 112, depending on the "branch" (see below). The tap 111 may provide a connection to a customer premises equipment (CPE) 110 or radio head 122 (e.g., an eNodeB, gNodeB, WiFi access point (AP), a citizens band radio service (CBRS) transceiver, a modem, etc.). Radio heads 122 may also be directly connected to connection 133 or incorporate one of a tap 111 and a CPE 110 within the radio head 122. For simplicity and clarity of illustration, some taps 111 are shown with nothing connected to them. It will be understood that taps 111 may be connected with zero, one, or more than one CPE 110, radio head 122, and/or other devices and network components (e.g., edge compute, edge storage, virtualization elements, etc.). For clarity of illustration, each tap 111 is shown connecting to nothing, a single CPE 110, or a single RF radio head 122. It will also be understood that a connection to a tap 111 may be a wired connection or may be wireless (e.g., where tap 111 has wireless capability such as Wi-Fi, 4G, 5G, 6G, CBRS, leveraging a TV white space band, etc.).

The connection 113 may be referred to as a branch, that may split into two or more sub-branches (also referred to as a branch). A branch may be passive (e.g., no amplifier), non-passive (e.g., including an amplifier 112), or a mix thereof (e.g., initially passive and then non-passive after an amplifier 112).

In the example of FIG. 1, radio head 122(3) includes multi-channel element 150 (e.g., hardware, firmware, and/or software) that implements multi-channel communications. For example, multi-channel element 150 enables radio head 122(3) to implement multi-channel communication with dual-channel devices (e.g., see devices 202 of FIG. 2). Although shown within radio head 122(3), multi-channel element 150 may be implemented within any of CPE 110 and radio head 122.

In the case of the multi-channel communications system 100, multi-channel element 150 may be implemented by any one of CPE 110 and radio head 122, as described in further detail below and shown in FIG. 2. The following description may, in some examples, be directed to an implementation at a modem or at a device that may communicate with a modem, but it is to be understood that the techniques described herein are equally applicable to any network connected device that receives and transmits via the network, such as any of radio head 122 and CPE 110. Examples of radio head 122 include but are not limited to a Wi-Fi access point (AP), an eNodeB, a gNodeB, a small cell, or the like.

The multi-channel element 150 described herein is therefore of particular advantageous use for the access network paradigm, for example, in the cable environment or other telecommunication applications, and may be implemented with respect to 4G, 5G, and 6G networks and related applications, as well as xhaul, fronthaul, backhaul, and midhaul deployments, and also for both short- and long-haul architectures.

Exemplary embodiments of multi-channel communications systems 100 and methods for digital and/or optical communication networks are described above in detail. The systems and methods of this disclosure though, are not limited to only the specific embodiments described herein, but rather, the components and/or steps of their implementation may be utilized independently and separately from other components and/or steps described herein.

The present embodiments thus realize significant improvements to signal recovery and processing of the upstream burst signals at the OLT. For efficient recovery and processing of upstream transmissions at the OLT, the OLT must be able to respond rapidly to recover the burst signals from the various ONUs within a short time duration, and then be able to reset itself for the next incoming upstream burst. In comparison with burst-mode signal recovery techniques used by direct-detection PONs, signal recovery in the coherent PON is considerably more challenging due to the greater complexity of coherent optical signals, which are modulated and multiplexed on phase, polarization, and amplitude.

The present embodiments still further overcome the unsuitability of conventional continuous-mode coherent detection and digital signal processing (DSP) used in P2P links, which are typically based on blind or feedback-type equalization techniques, and thus required too long an acquisition time to accomplish signal recovery for burst-mode detection. The present systems and methods additionally effectively address the additional challenges arising from burst-mode DSP, such as: (i) other non-DSP subsystems are required to operate at sufficient similar high speed to detect the short optical bursts; and (ii) frequency-offset estimation must be similarly sufficiently fast, and also able to withstand a large offset range due to possible laser wavelength drift.

According to the embodiments described above, an innovative preamble architectural design is provided, as well as a corresponding burst-mode DSP solution, enabling significantly improved coherent upstream burst-mode detection in a 100G time-division multiplexing (TDM) coherent-passive optical networks (PONs). The above embodiments further demonstrate that these advantageous architectural and DSP function systems and methods are experimentally verified to be both reliable and efficient over a variety of different relevant test scenarios and test conditions.

The unique preamble architectural configuration described herein provides still further advantages over conventional techniques by enabling individual portions of the new preamble structure to be shared by multiple DSP functions, or functional units, thereby greatly reducing the overall preamble length. The experimental results described above further confirmed a robust performance of the present embodiments over a large frequency-offset, residual fiber dispersion, and long running times. As a proof-of-concept, a relevant testing system setup achieved effective coherent upstream burst-mode detection of a 100 Gb/s PDM-quadrature phase shift keying (QPSK) signals, with 36-decibel (dB) power budget, and after 50-kilometer (km) standard mode fiber (SMF) transmission using the present preamble architectures having a length of 71.68 nanoseconds (ns) at the transmission-side, with corresponding burst-mode DSP at the receiver-side. The present systems and methods still further demonstrated approximately 20 dB of received power dynamic range for burst signal detection in a 100-Gb/s/k TDM coherent-PON.

Figure 2:
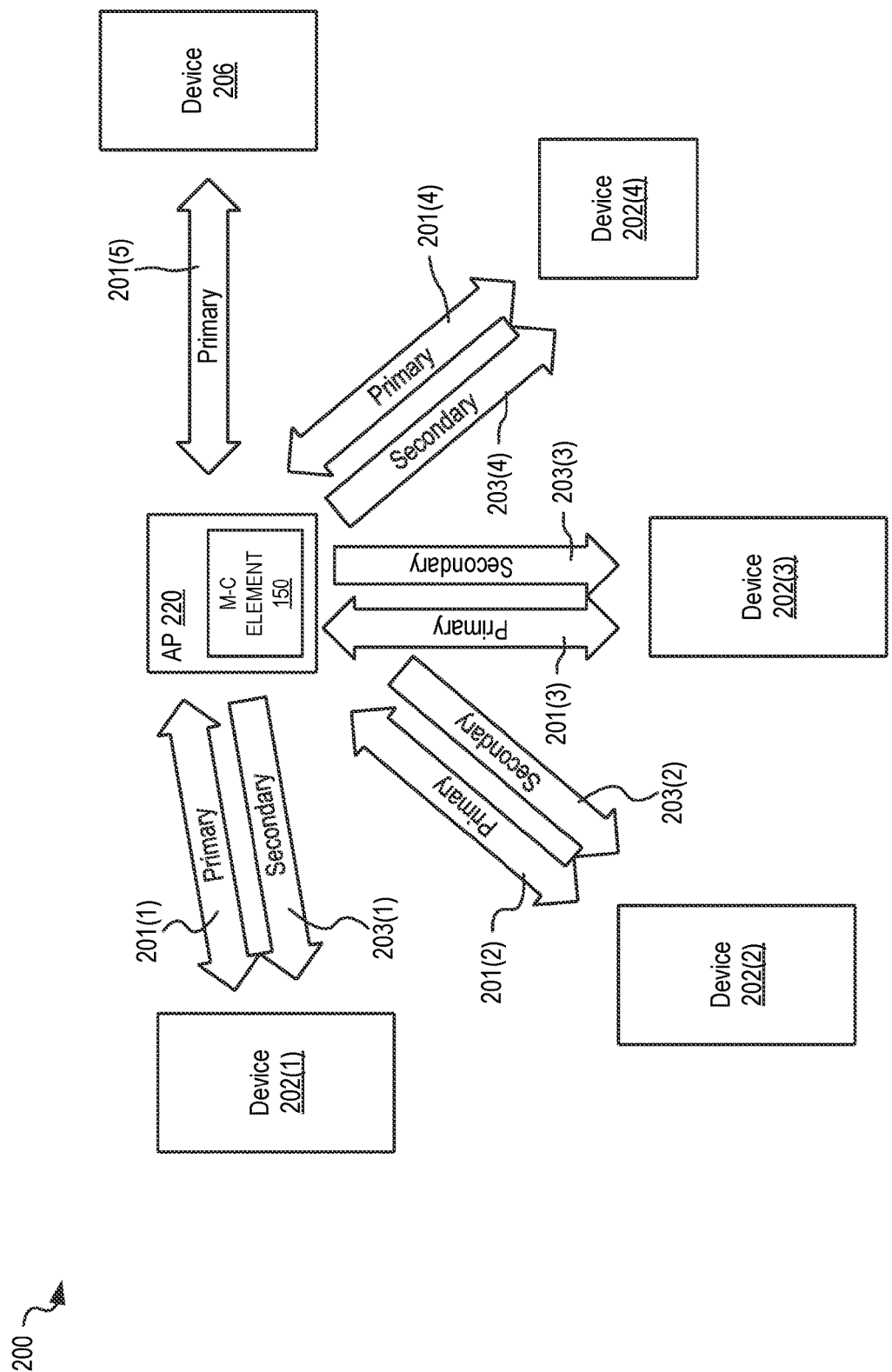
FIG. 2 is a schematic diagram illustrating multi-channel communications 200 as implemented by the multi-channel communications system 100 of FIG. 1, in embodiments.

FIG. 2 is a schematic diagram illustrating multi-channel communications 200 as implemented by the multi-channel communications system 100 of FIG. 1. The multi-channel communications 200 may be characterized for exemplary purposes as multi-channel due to having an ability to separately or independently operate, support, configure, etc., multiple communication paths, signals, and the like, between a plurality of devices 202 (e.g., CPEs) and an AP 220. AP 220 may concurrently communicate with one or more non-dual-channel device 206. AP 220 may represent radio head 122(3) of FIG. 1. The communications may occur over a related wired and/or wireless medium(s), such as to facilitate data delivery between the plurality of devices 202 and/or between the plurality of devices 202 and devices, servers, networks, etc. located outside/upstream of the AP 220. The AP 220 may correspond with any AP, base station, node, gateway, interface, etc. positioned to facilitate exchanging signaling between one network and another and/or terminating or otherwise managing communications for a singular or unconnected network. In the example of FIG. 2, multi-channel element 150 executed within AP 220 enables multi-channel communication with each of the plurality of devices 202, and thereby implements wireless and/or wired signaling exchanges therefrom with a service provider, such as but not necessarily limited to an Internet service provider (ISP), a multiple system operator (MSO), a cellular communication provider, a cable television provider, a home network, a local area network (LAN), etc. with the AP 220 being configured in accordance with the associated provider to facilitate the signal exchange with the plurality of devices 202.

Multi-channel element 150 causes AP 220 to provide a primary channel 201 and one or more secondary channels 203 for communication between each of the plurality of devices 202. AP 220 may use only primary channel 201 for communication with non-dual-channel device 206. The primary channel 201 may be used for bidirectional/half-duplex communication according to Wi-Fi, Long-Term Evolution (LTE), Ethernet, MOAC, etc., thereby allowing upstream and downstream communication of network traffic. The secondary channel 203 may be used for limited half-duplex and/or non-duplex communications, such as providing downstream but not upstream communication of network traffic. Collision avoidance, congestion control, carrier sense, request to send/clear to send (RTS/CTS) and other processes, such as that described in U.S. application Ser. No. 13/537,707, entitled Network Traffic Prioritization, the disclosure of which is hereby incorporated in its entirety by reference herein, may be employed to facilitate communications over the primary channels 201 and secondary channels 203. Limiting the secondary channel 203 to certain downstream communications is beneficial in ameliorating the amount of time spent undertaking collision avoidance. This may result from the prohibition on upstream communication of network traffic essentially producing a contention-less environment that substantially eliminates a need for the APs 220 to compete with the plurality of devices 202 for resources. The AP 220 may employ some of the backoff timers and other capabilities utilized on the primary channel 201 to avoid collisions, such as to avoid collisions with neighboring APs, but those timers and factors may be comparatively shorter/less due to considerations and allocations for the plurality of devices 202 being essentially unnecessary. The ability to operate the secondary channel 203 without the additional messaging, burdens, bandwidth, etc. consumed by the primary channel 201 in thwarting collisions may be beneficial in avoiding the related loss/consumption of time, network resources, etc. Those resources may then be used to instead improve throughput, quality of service (QOS), packet loss, reliability, etc. for the secondary channel 203 in comparison to the primary channel 201 (e.g., freeing additional capabilities of the secondary channel 203 to facilitate data delivery instead of managing network communications).

The primary channel 201 may operate over one frequency or multiple and/or ranges of frequencies separate from or otherwise differentiated from frequencies of the secondary channel 203, for example, the same frequencies may be utilized by both the primary channel 201 and secondary channel 203 at different times and/or the utilized frequencies may change over time. The different channels may simultaneously carry data between the AP 220 and the same one and/or different ones of the plurality of devices 202. For example, the AP 220 may use half-duplex communications over the primary channel 201 while simultaneously transmitting downstream over the secondary channel 203. Multi-channel element 150 may distinguish network traffic from non-network traffic, based on the communications being within layer-2 or data link layer traffic of the Open Systems Interconnection model (OSI model), which may be considered non-network traffic, or within layer-4 or transport layer traffic of the OSI model, which may be considered to be network traffic. The difference between layer-2 and layer-4 traffic, respectively referred to as non-network traffic and network traffic, may be determined based on addressing associated with packets, frames, and the like. For example, source and destination addresses for layer-2 communications may be devoid of Internet protocol (IP) addresses, instead using media access control (MAC) addresses, whereas source and destination addresses for layer-4 communications may utilize IP addresses. For example, the layer-2 or non-network traffic may be in the form of layer-2 acknowledgements required by the layer-2 protocol that is used on the channel. Thus, in an embodiment, multi-channel element 150 may distinguish non-network traffic and network traffic based on whether the address uses an IP address or a MAC address.

Figure 3:
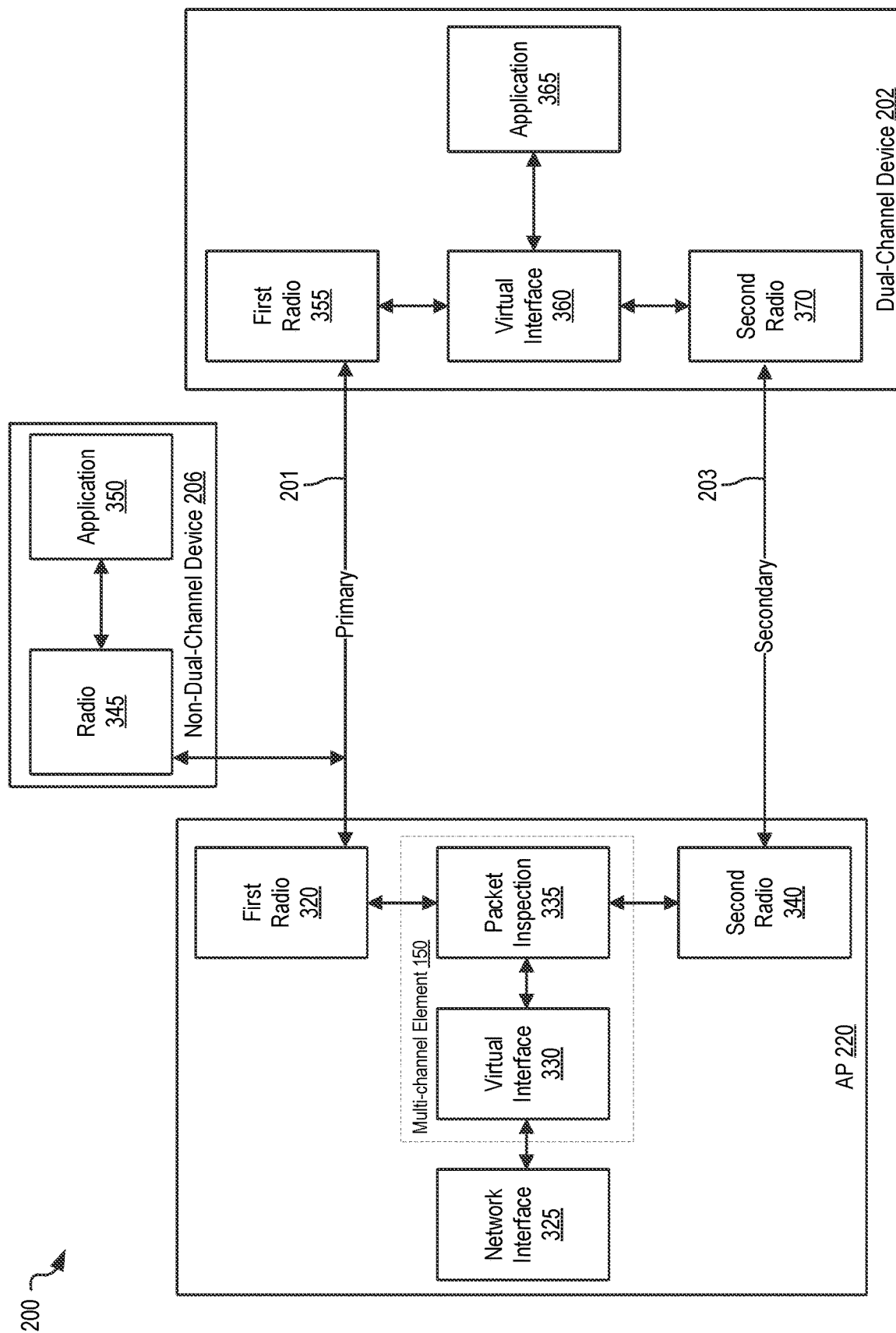
FIG. 3 is a functional block diagram illustrating the AP, the dual-channel enabled device, and the non-dual-channel device of FIG. 2 in further example detail.

FIG. 3 is a functional block diagram illustrating AP 220, dual-channel enabled device 202 and non-dual-channel device 206 of FIG. 2 in further example detail. The AP 220, non-dual-channel device 206 and the dual-channel device 202 are described for exemplary purposes with respect to facilitating wireless (e.g., Wi-Fi) communications in accordance with the Institute of Electrical and Electronics Engineers (IEEE) 802.11: Telecommunications and information exchange between systems—Local and metropolitan area networks—Specific requirements-Part 11: Wireless LAN Medium Access Control (MAC) and Physical Layer (PHY) Specifications, 2012, and/or other specifications within the IEEE 802.11 series, including but not necessarily limited to 802.11k, 802.11u and 802.11v, the disclosures of which are hereby incorporated in their entireties by reference herein. Each of the AP 220, the non-dual-channel device 206, and the dual-channel device 202 may include a non-transitory computer-readable medium having a plurality of non-transitory instructions stored thereon and executable with an included processor (not shown) to facilitate some or all of the operations contemplated herein. Each of the AP 220, the non-dual-channel device 206, and the dual-channel device 202 are shown with respect to designators (e.g., rectangles) for illustrative purposes of representing hardware, software or other capabilities according to its attendant functionality.

The AP 220 includes a network interface 325, a virtual interface 330, a packet inspection feature 335, and first and second radios 320, 340, that implement communications over primary and secondary communication channels 201 and 202, respectively. In the following examples, communication between AP 220 and devices 206 and 202 are predominately described as packet-based communications, such as those associated with User Datagram Protocol (UDP) and Transmission Control Protocol (TCP). The network interface 325 may include input/output components sufficient to facilitate exchanging (wired and/or wireless) packets with a wide area network (WAN) or other network/device in communication therewith. The virtual interface 330 may provide an application interface for obfuscating interactions between the network interface 325 and the packet inspection feature 335, such as to enable an application to communicate packets therebetween. The packet inspection feature 335 may include a buffer and/or other constructs to facilitate processing of the packets being exchanged through the AP 220, such as to facilitate the multi-channel communications contemplated herein. The packet inspection feature 335 exchanges packets with first radio 320 and second radio 340, and optionally additional radios on the AP 220 if available. The first radio 320 operates to exchange packets over the primary channel 201, and the second radio 340 operates to exchange packets over the secondary channel 203. The packet inspection feature 335 allows multiplexing (upstream) and demultiplexing (downstream) of packets relative to the network interface 325 to enable the network interface 325 to exchange the packets in a common transport stream. For each packet received via network interface 325, the packet inspection feature 335 routes the packet to one of first radio 320 and second radio 340 based on predefined filter settings corresponding to the destination dual-channel device 202. For example, as described above, the packet inspection feature 335 may distinguish non-network traffic and network traffic based on whether the address uses an IP address or a MAC address and route the packet to the appropriate radio. Although this functionality is described with respect to packet inspection feature 335, this functionality may be implemented, at least in part, within other components of the AP 220, such as the virtual interface 330, without departing from the scope hereof.

The non-dual-channel device 206 includes an application 350 (e.g., implementing functionality of non-dual-channel device 206) that communicates with a radio 345 to exchange packets with AP 220 via primary channel 201. Since the non-dual-channel device 206 does not have a second radio, non-dual-channel device 206 communicates with AP 220 using only primary channel 201. The dual-channel device 202 includes a first radio 355, a second radio 370, and a virtual interface 360 that facilitates communication between an application 365 and AP 220. The first radio 355 and the second radio 370 are configured to communicate with the first radio 320 and the second radio 340, respectively, of the AP 220. The virtual interface 360 may be an application layer construct or logical element that processes packets exchanged between dual-channel device 202 and AP 220 via the first and second radios 355 and 370 in a manner obfuscated to the application 365. Advantageously, the application 365 communicates with AP 220 without being impacted by the complexities of using dual-channel communication. For example, in a downstream direction, the application 365 may receive packets from the virtual interface 360 that appear to have been received over a single channel (e.g., without identifying the radio from which the packets were received). Likewise, in an upstream direction, the application 365 transmits packets to the virtual interface 360 without any need to specify which radio that packet is to be transmitted over, whereby the virtual interface 360 automatically sends the packet to the appropriate first or second radio 355 and 370. That is, virtual interface 360 sends packets received from application 365 to one of the first and second radios 355 and 370 based on whether the address uses an IP address or a MAC address, for example.

Figure 4:
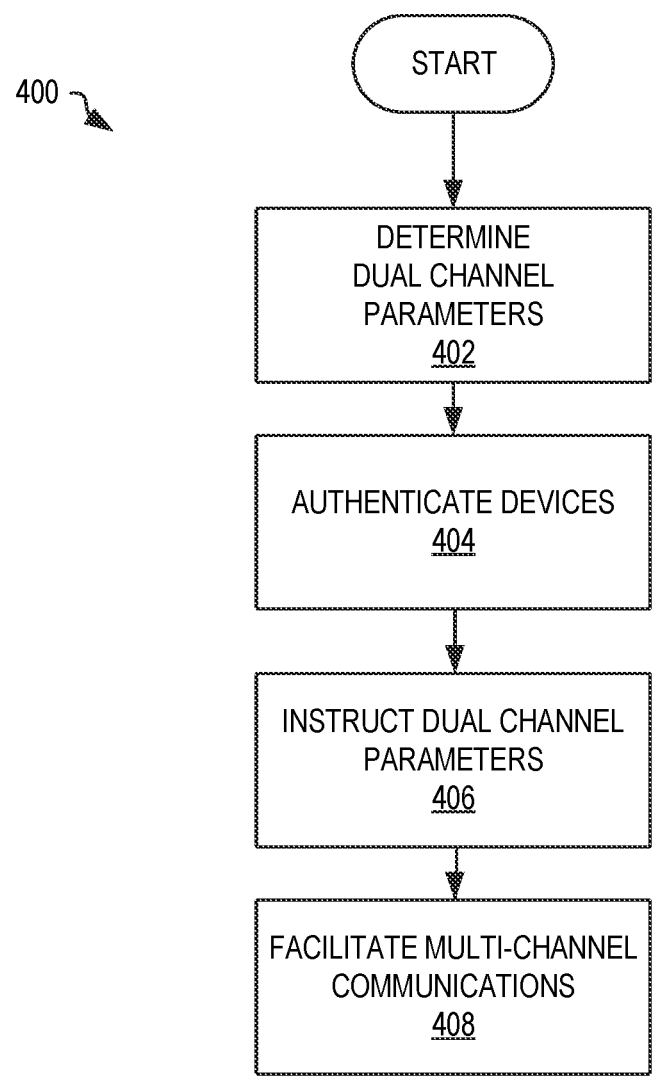
FIG. 4 is a flowchart illustrating one example method for the multi-channel communications of FIG. 2, in embodiments.

FIG. 4 is a flowchart illustrating one example method 400 for the multi-channel communications 200 of FIG. 2. The method 400 may be beneficial when any number of channels are used for wired and/or wireless communications between devices that have multi-channel communication capability. However, for clarity of description, the method 400 is described following the example of FIG. 2 where two wireless channels are used for communications between an AP (e.g., AP 220) and at least one device 202.

In block 402, method 400 determines dual channel parameters for selectively controlling communications over multi-channels in order to maximize efficiency, throughput or other operational characteristics of the multi-channels. For example, the parameters may control the types of communications permitted over each of primary channel 201 and a secondary channel 203. The communications permitted over each of the channels is disparately controlled to maximize and improve performance in comparison to dual channel environments where the types of communications over each channel is not similarly controlled, such as when both channels are permitted to engage in the same types of communications.

As described above, by selectively controlling communications over the primary channel and the secondary channel may reduce the amount of time collectively spent by the AP and the devices contending for access to the secondary channel. By limiting the secondary channel to download of certain types of communications, the secondary channel is more readily available to transmit the data, as compared to operation of primary channel 201 which requires incurs contention time and/or other limitations. The contemplated network traffic may be used to characterize virtually any type of data transmission differentiated from non-network traffic. The non-network traffic may be characterized as radio acknowledgments or other layer-2 or data link layer traffic necessary to facilitate certain types of wireless communications, such as those compliant with the above-referenced Wi-Fi specifications. The non-network traffic may be optionally characterized as that associated with packets, frames or other messages transmitted to confirm delivery of data (network traffic) without being dependent on assessing or otherwise interpreting contents or information within the data being confirmed.

The network traffic may correspond with layer-4 or transport layer traffic/communications utilized to facilitate transmission of data intended to be processed by an application, including attendant network acknowledgments and other confirmations utilized to apprise the related applications of communication statuses. The network traffic may be communicated according to TCP whereby buffers or other devices/applications processing TCP packets (network traffic) transmit responsive network acknowledgments (network traffic) at a fixed frequency or on a sliding scale. For example, the rate/frequency of network acknowledgments may vary depending on the success of packet deliveries. The device transmitting the network acknowledgments (network traffic) to confirm receipt of TCP packets or other packets may additionally transmit radio acknowledgments (non-network traffic) depending on its particular configuration, for example, a radio or other interface processing the network traffic may be configured to issue radio acknowledgments (non-network traffic) depending on receipt of layer-2 frames being used to carry the desired transmission (network traffic). The radio acknowledgments may be issued in addition to the network acknowledgments due to layer-2 related protocols requiring a corresponding radio interface to acknowledge frame receipt and layer-4 related protocols requiring a corresponding application utilizing the TCP packets or other data included within the layer-2 frames to acknowledge corresponding processing thereof. The frequency of the radio acknowledgments may differ from the frequency of the network acknowledgments depending on protocols and/or other operating parameters.

Figure 5:
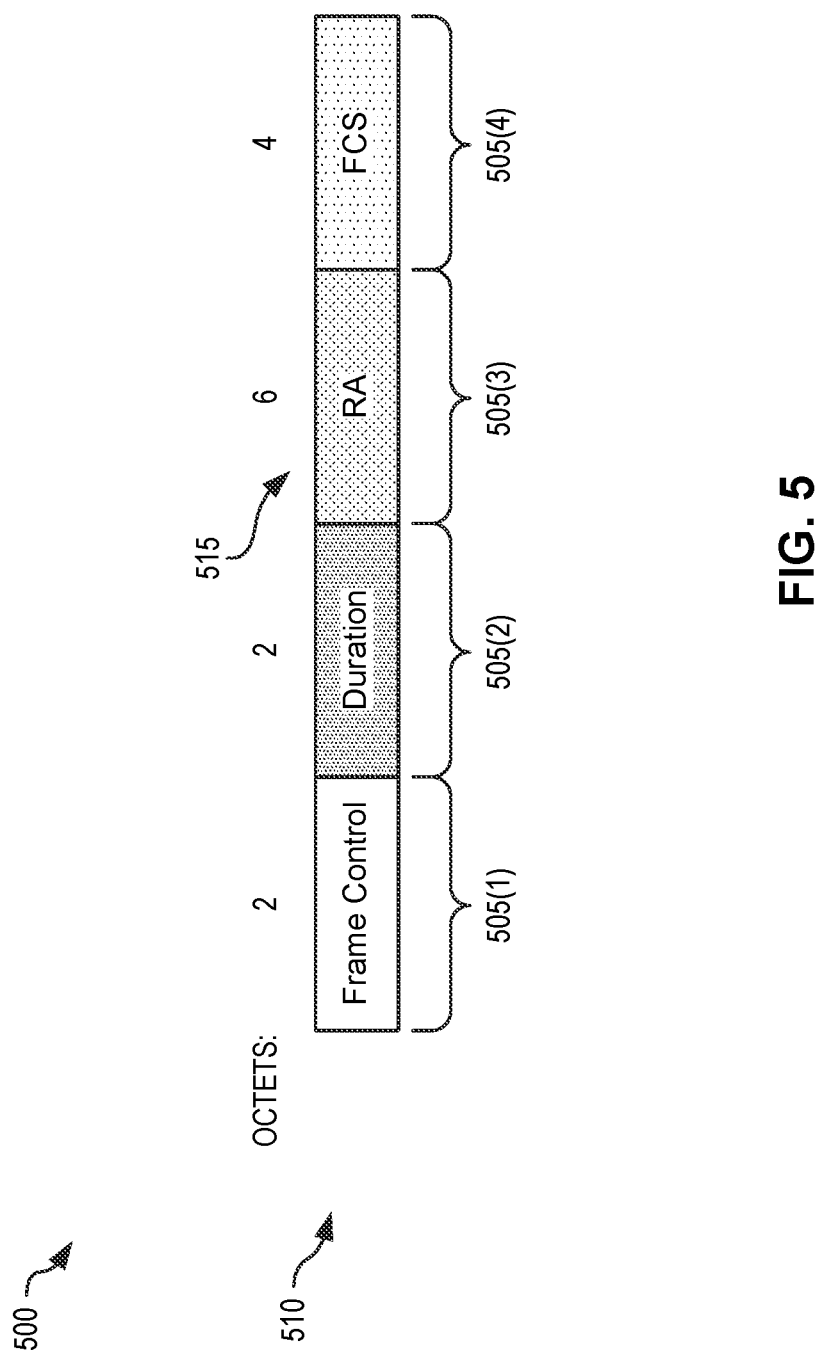
FIG. 5 is a schematic diagram illustrating one example radio acknowledgment used in radio communication protocols between the AP and the device of FIG. 2, in embodiments.
Figure 6:
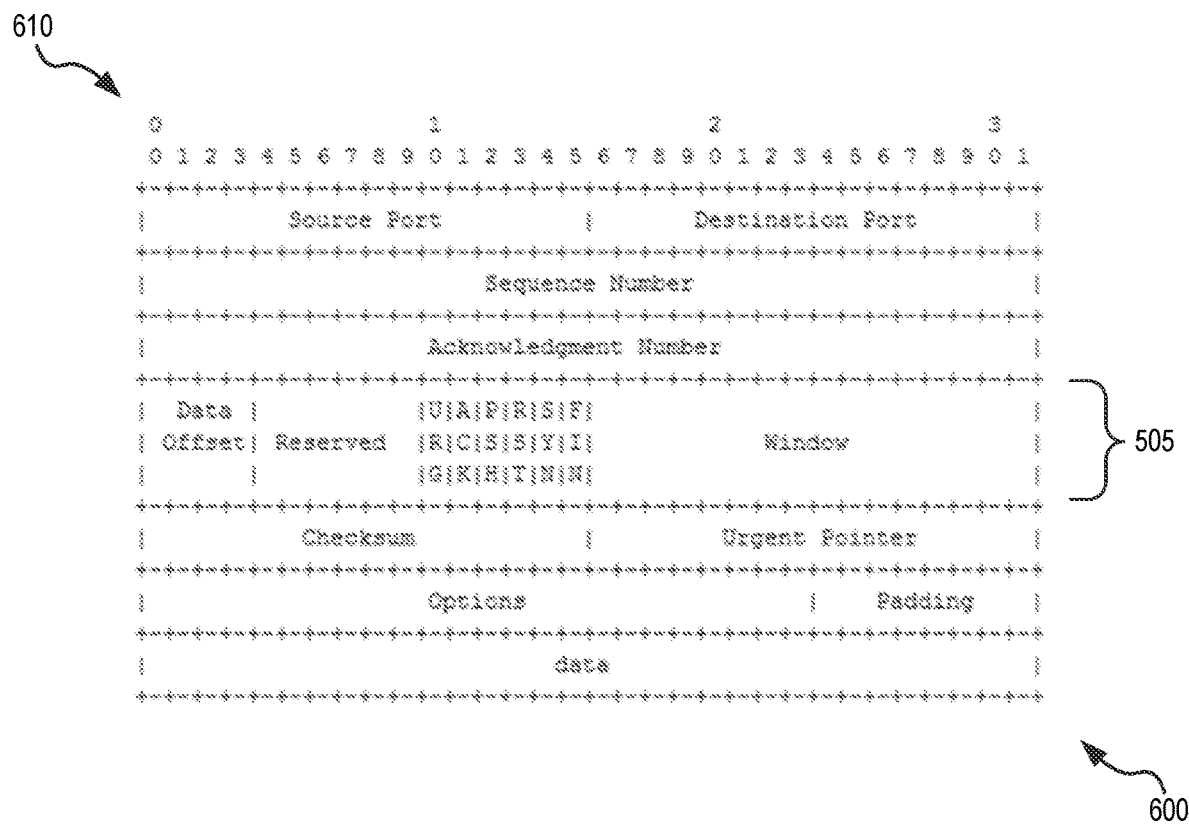
FIG. 6 is a schematic diagram illustrating one example networking acknowledgment implemented by the network interface of FIG. 3, in embodiments.

FIG. 5 is a schematic diagram illustrating one example radio acknowledgment (RA) 500 used in radio communication protocols between AP 220 and device 202 of FIG. 2. FIG. 6 is a schematic diagram illustrating one example networking acknowledgment 600 implemented by the network interface 325 of FIG. 3. RA 500 is an example of non-network traffic and network acknowledgments 600 is an example of network traffic. The RA 500 is illustrated in accordance with IEEE specification 802.11-2012 and the network acknowledgment 600 is illustrated in accordance with the TCP suite of protocols. The RA 500 may be slavishly generated without assessing information/data included within a corresponding payload and may be smaller than the network acknowledgment. The RA 500 includes a number of fields 505(1)-(4), each of which include a number of octets 510. Similarly, the networking acknowledgment 600 may include a number of octets 610. Octets 510/610 include information bits conveying information designated (or left open) for the field 505 (or subfield). An RA field 515 of the ACK frame may be copied from the Address 2 field of the immediately previous individually addressed data, management, BlockAckReq, BlockAck, and/or PS-Poll frames, i.e., a MAC address included within a layer-2 frame triggering the RA 500. The remaining fields 505 in the RA 500 may be devoid of or otherwise omit IP addresses, for example, the IP addresses may instead be implemented at or within a source port field and/or a destination port field of the network acknowledgment 600. Detail regarding the nature of the additional fields 505 illustrated in FIGS. 5 and 6 may be found in the corresponding documentation of the related specification and protocol, the disclosures of which are hereby incorporated by reference in their entireties.

In addition, or alternatively, to determining differences or characterizations sufficient for differentiating network traffic from non-network traffic, the dual channel parameters may also be determined to facilitate implementing a filter sufficient for filtering the network traffic and/or the non-network traffic at the AP 220 and/or the devices 202. The corresponding parameters may be used to set filter rules and/or filter variables for packet size, destination ports, protocol, tags or a combination of these or other variables. The filter variables and/or filter rules may be utilized by the virtual interfaces and/or the packet inspection features to facilitate processing communications and/or otherwise generating routing tables or procedures for communicating over the primary and secondary channels in the contemplated manner. In one embodiment, the filter facilitates processing for determining whether data being transmitted between the AP 220 and the devices 202 should be communicated over the primary channel or the secondary channel. At least with respect to the dual-channel devices, the filter can be utilized by the AP 220 to facilitate selecting one and/or both of the primary and secondary channels 201, 203, to facilitate downstream transmissions to the individual devices.

The filter may implement corresponding results depending on whether a metric for the filter variables exceeds a corresponding threshold, for example, one or more of: (1) destination port/addresses to determine whether communications are destined for a dual-channel or non-dual-channel device, e.g., to direct all communications over the primary channel for non-dual-channel devices; (2) packet size to direct packet sizes exceeding a threshold over the secondary channel; (3) protocol/data type to default particular protocol/data types to the secondary channel and others to the primary channel; (4) network performance characteristics reflective of overall network performance, i.e. network throughput measured from combining performance of both the primary and secondary channels, to determine whether communications should be directed over the primary or secondary channel, e.g., to transmit entirety of communications over the selected one of the primary and secondary channels and/or to partition communications, i.e. transport streams of packet flows, destined for one device over both of the primary and secondary channels e.g., to facilitate partially transmitting communications over both of the primary and second channels to a particular device; and/or (5) using content type, such as for identifying video data, music data, or other data where large volumes of data need to be moved, to route higher throughput dependent content types over the secondary channel. The filter may use these variables to generate rules and tests for generating corresponding results, such as a first result when appropriate to communicate over the primary channel and a second result when appropriate to communicate over the secondary channel.

In block 404, method 400 authenticates the device for communication with the AP. The authentication process may include the AP 220 comparing AP radio capabilities relative to radio capabilities of device 202 to determine whether the device 202 is dual channel or non-dual channel. In the event the AP 220 utilizes 2.4 gigahertz (GHz) for the primary channel 201 and 5.0 GHz for the secondary channel 203, the authentication process may include the AP 220 determining whether the devices 202 include capabilities for supporting 2.4 GHz and 5.0 GHz frequency bands. This authentication process may further include assessing additional radios and capabilities of the AP 220 and the device 202, such as to determine whether the device 202 supports additional frequencies, e.g., 60 GHz, for purposes of facilitating communications over a tertiary channel or more channels. The additional channels (e.g., beyond the primary and secondary channels) may operate similarly to the secondary channel 203, but at different frequency ranges, and/or further filters may be applied thereto to control channel routing, e.g., the secondary channel may be utilized for one type of content, such as voice data, and the tertiary channel operating at a higher frequency and/or throughput may be utilized for another type of content, such as more volume dependent content like video data.

The authentication process may optionally include processes for facilitating communications according to Access Network Query Protocol (ANQP), including use of an ANQP vendor specific field to communicate to the AP if a device can support the dual band functionality. ANQP responses may be utilized to include information from the AP as to the secondary channel to be used, such as a service set identifier (SSID) and access method to be used. The AP may optionally use these capabilities to allow the secondary channel to be a "hidden" SSID and make use of access methods that would not need to be publicly known, which may be beneficial in thwarting snooping or packet monitoring in the event the secondary channel facilitates communication of data design enhanced security. At any time, any associated device that supports the dual band could be signaled by the AP again using ANQP messages to switch between one of a plurality of sub-channels within the secondary channel, i.e., the secondary channel may include multiple sub-channels at different sub-frequencies associated with the corresponding frequency band. These would allow the AP to selectively put various devices on different secondary channels, which could be done as a result of new traffic being sent to devices producing a need to balance out the traffic flow on each available secondary channel.

In block 406, method 400 instructs the device with respect to the relevant dual channel parameters. For example, AP 220 may provide device 202 with one or more SSIDs depending on whether the device is able to facilitate communications over one or both of the primary and secondary channels 201 and 203, filtering or routing instructions for upstream and/or downstream communications, and other operating instructions necessary to facilitate the operations contemplated herein. The instructions may optionally be utilized to facilitate configuring the virtual interface 360 of the device 202 to provide an automated mechanism for processing downstream communications received over either one of the radios 355 and 370 and to facilitate upstream communications over either one of the radios. In one embodiment, the device 202 is instructed to limit certain types of communications being communicated upstream over the secondary channel 203 to ameliorate contention time and other time spent arbitrating access to the secondary channel 203. The limitations placed upon communications over the secondary channel 203 may be implemented so that all network traffic communications occur over the primary channel 201, thereby freeing the secondary channel 203 to maximize capabilities for supporting downstream communications. The device 202 may be instructed in this manner to transmit some upstream, non-network traffic communications over the secondary channel, such as to enable radio acknowledgments, and to transmit all other upstream network traffic, such as network acknowledgments and transport streams originating at the devices, solely over the primary channel.

In block 408, method 400 implements multi-channel communications between the Ap and the device. Accordingly, communication capabilities are maximized within a networking environment employing the primary and secondary channels 201, 203, and/or additional channels. In one non-limiting aspect of the present embodiments, the dual channel parameters and the processes are used for authenticating and instructing the devices to produce a networking architecture whereby the AP 220 selectively determines communications for transmission over the primary and secondary channels 201, 203, such as to prevent the devices 202 from communicating anything but non-network traffic upstream over the secondary channel 203 for purposes of freeing the secondary channel from contention or access restraints associated with the primary channel, which may then enable the secondary channel to be used to maximize throughput for communications occurring downstream over the secondary channel. The restriction on the devices from transmitting certain communications upstream over the secondary channel may be sufficient to allow the AP to effectively arbitrate all communications over the secondary channel without having to take into consideration upstream communication requests of the devices. The radio acknowledgments may be of such a nature that their transmission upstream over the secondary channel can be considered as insufficient or irrelevant in so far as affecting contention or access processes used to govern use of the secondary channel, at least with respect to how the corresponding metrics are used to govern access to the primary channel.

In certain embodiments, the secondary channel is freed from the contention or usage constraints otherwise employed on the primary channel. The resulting effect enables the AP to selectively control the transmission of downstream communications over the secondary channel without having to consume or delay use of airtime or other network resources for purposes of assessing whether any upstream communications are likely to collide therewith or otherwise adversely affect the communication thereof. In certain embodiments, the AP utilizes a secondary channel in an efficient manner by requiring the devices 202 to transmit all acknowledgments except the radio acknowledgments over the primary channel regardless of whether the attendant communications were provided thereto over the primary or secondary channel. The AP may instruct and/or the devices may be otherwise controlled, such as through the filter parameters or routing tables, to prevent transmitting network traffic upstream over the secondary channel. In certain embodiments, the virtual interfaces of the devices and the AP are obfuscated from the applications using them such that the applications are unaware of which radio is used to transmit upstream/downstream communications, which through the noted programming thereof, enables use of the secondary channels for downstream network traffic and prevents the use thereof for network traffic, i.e., the filters, routing tables, etc. may be utilized to facilitate enabling and disabling/preventing communications over the primary and secondary channels.

As supported above, in certain embodiments a Dual Channel Wi-Fi implementation uses two or more wireless or wired channels/paths for the delivery of data to endpoints (e.g., devices 202), by creating two or more separate non-conflicting paths of data delivery. In the case of Wi-Fi devices, two or more Wi-Fi channels may be employed with one of the channels used as a primary channel and the remaining channels used for downstream only data transport. The focus of the Dual Channel Wi-Fi could be used over any combination of data transport mediums ranging from Wi-Fi and LTE to Ethernet and MOAC. The primary path or channel may operate in a normal fashion allowing both Dual Channel capable devices and legacy devices to communicate with no impact to current implementations. Dual Channel enabled devices may make use of a second or more paths or channels strictly for the downstream of classified data/traffic. One aspect of the Dual Channel operation may be to allow the downstream source the full availability of the downstream paths without having to contend for a transmit opportunity, which may be accomplished by using an unused or lightly used path/channel for downstream while normal traffic exchange is done over the primary path/channel. Through an exchange of control messages with the AP or Router, the device can setup the downstream only path/channel that the AP may, based on preconfigured filtering rules, direct downstream data either on the primary path/channel or the downstream path/channel. All upstream data may be limited/sent on the primary path/channel to enable the AP or router full time access to the downstream path/channel without the delays resulting from upstream data and/or related collisions with downstream data.

Linux Kernel Policy-Based Layer 2 Traffic Switcher

In the example of FIG. 2, device 202 may be a Dual-Channel Wi-Fi client that has two Ethernet/Wi-Fi interfaces (e.g., identified as "eth0" and "eth1" in Linux operating system (OS)), but may have only one IP (e.g., 192.168.1.100) interface. Traffic destined for the Dual-Channel Wi-Fi client (e.g., IP interface 192.168.1.100) may be transported via either Ethernet/Wi-Fi interfaces (e.g., eth0 or eth1) at the discretion of the Dual-Channel Wi-Fi router.

Figure 7:
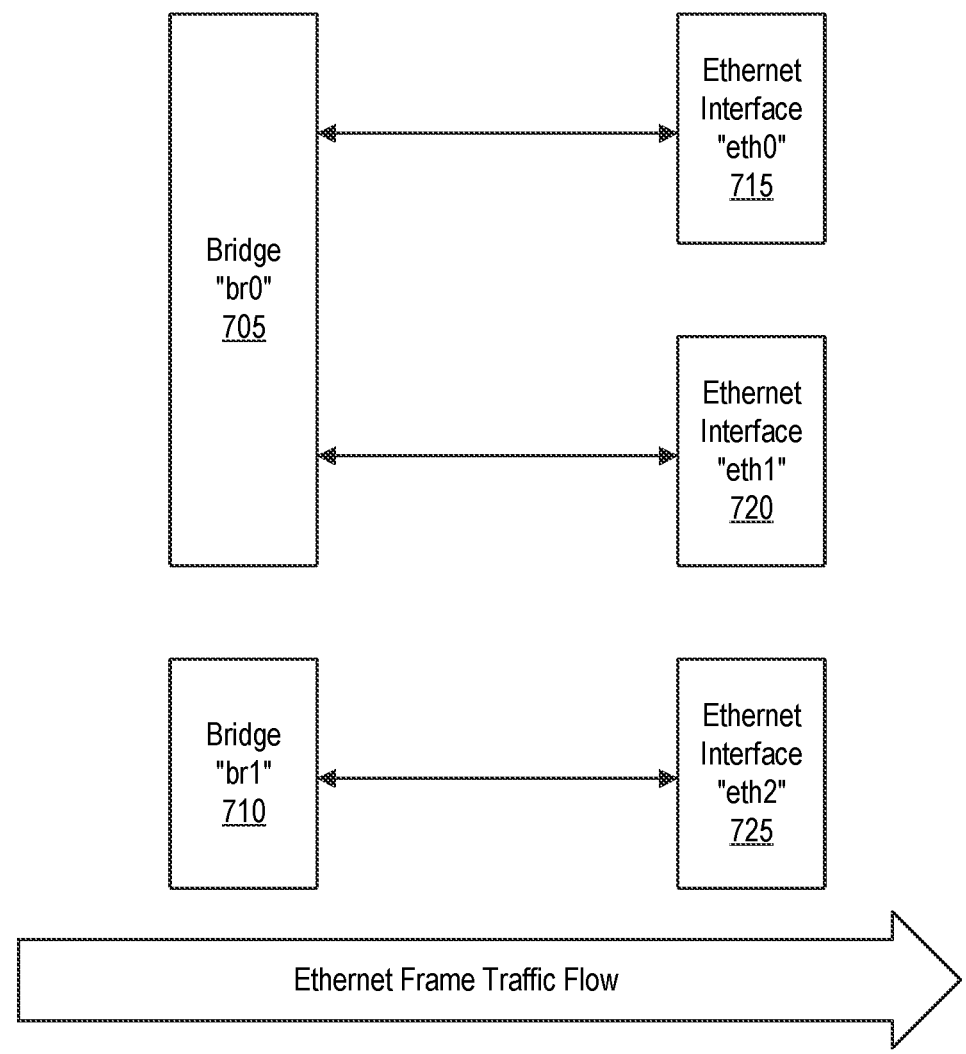
FIG. 7 is a block diagram illustrating ethernet traffic flow through a conventional Linux OS bridge-based Ethernet interface.

FIG. 7 is a block diagram illustrating ethernet traffic flow through a conventional Linux OS bridge-based Ethernet interface 700. Interface 700 includes a first bridge 705 (e.g., identified as "br0" within the Linux OS), a second bridge 710 (e.g., identified as "br1" within the Linux OS), and three Ethernet interfaces 715, 720, and 725. The Ethernet interface 715 (e.g., identified as "eth0" within the Linux OS) and the Ethernet interface 720 (e.g., identified as "eth1" within the Linux OS) are connected to bridge 705, and Ethernet interface 725 (e.g., identified as "eth2" within the Linux OS) is connected to bridge 710.

The Linux bridge 705/710 is a standard Linux feature which enables a Linux kernel to act as an Ethernet bridge/switch by bridging together one or more configured Ethernet interfaces 715/720/725 (e.g., "ports"). In Linux OS bridge-based Ethernet interface 700, each bridge interface transmits directly out of the port interface that connects to a network that the frame is destined for. The known Linux "ebtables" tool provides limited OSI model layer level filtering but does not provide higher OSI model level protocol filtering, such as for layer-4 (e.g., TCP/UDP). Accordingly, the Linux "ebtables" tool does not provide sufficient control over packet routing as required by AP 220 of FIGS. 2 and 3. In addition to the higher-layer filtering, AP 220 also requires load balancing. When a client device (e.g., device 202) uses multiple Ethernet/Wi-Fi interfaces, load-balancing (e.g., a policy and implementation) is required to balance traffic over the available interfaces and channels.

Figure 8:
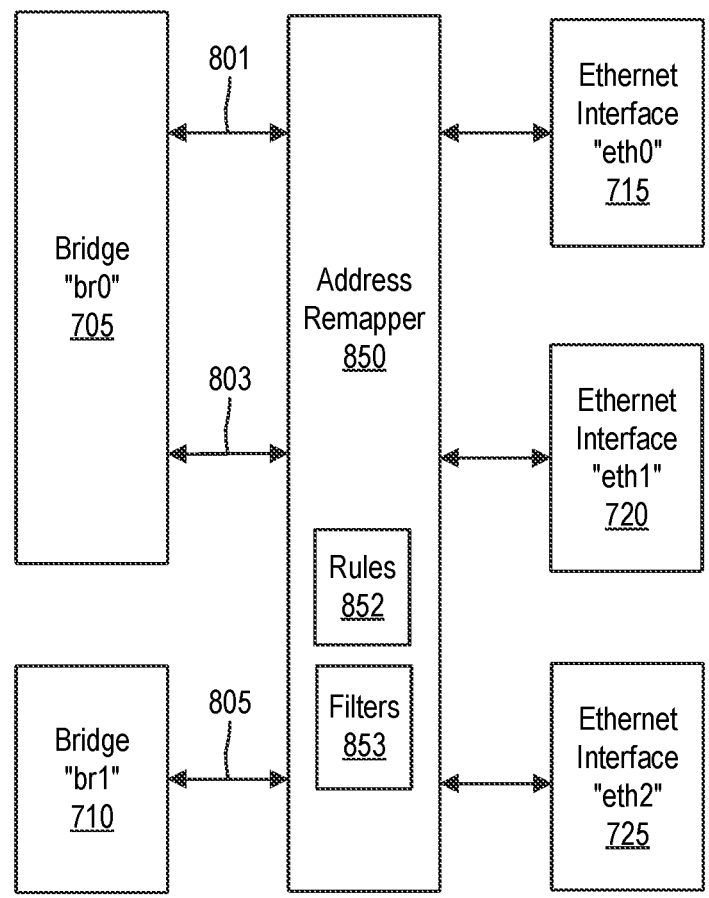
FIG. 8 is a block diagram illustrating the Linux OS bridge-based Ethernet interface of FIG. 7 further including an address remapper that overcomes the limitations of the Linux "ebtables" tool, in embodiments.
Figure 8:
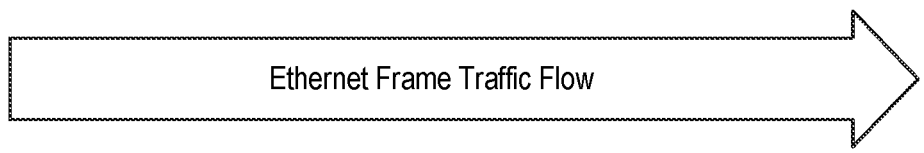

FIG. 8 is a block diagram illustrating the Linux OS bridge-based Ethernet interface 700 of FIG. 7 further including an address remapper 850 that overcomes the limitations of the Linux "ebtables" tool. In embodiments, address remapper 850 may represent, at least in part, multi-channel element 150 of FIGS. 1-3. The address remapper 850 (also known as a MAC address remapper) is implemented in software (e.g., machine-readable instructions executable by a processor) as a Linux kernel module that provides policy-based layer-2 traffic switching using rules 852 and filters 853 to rewrite a destination address (e.g., a destination MAC address) of certain matched outbound Ethernet frames. In certain embodiments, the address remapper 850 uses a "netfilter" hook of the Linux bridges 705/710 to capture network traffic (e.g., frames/packets) as is leaves the bridge. The rules 852 and filters 853 are defined to control the address remapper 850 to route the frames/packets to specific ports (e.g., ethernet interfaces 715, 720, and 725) and/or onto a different bridge interface (e.g., 705 and 710). The rules 852 and filters 853 may control address remapper 850 to identify and map/route traffic as high as OSI model layer-4. In certain embodiments, the address remapper 850 also supports load balancing. In certain embodiments, the address remapper 850 is implemented for a particular task, such as needs of the Dual-Channel Wi-Fi. With Dual-Channel Wi-Fi, a single device 202 (e.g., a network endpoint) may have multiple Ethernet/Wi-Fi MAC addresses that are used with a corresponding single layer-3 (IPv4/IPv6) address. When used in AP 220 of FIGS. 2 and 3, the address remapper 850 routes Ethernet frames to the Dual-Channel Wi-Fi client (device 202) via one of the primary channel 201 and the secondary channel 203.

In one example of operation, outbound Ethernet traffic 801 and 803 is intercepted by address remapper 850 as it leaves the first bridge 705, and outbound Ethernet traffic 805 is intercepted by address remapper 850 as it leaves the second bridge 710. Address remapper 850 may, based on rules 852 and filters 853, modify and re-route Ethernet and Wi-Fi traffic 801 leaving Linux OS bridge-based Ethernet interface 700. In certain embodiments, the address remapper 850 may be implemented in userland because at least some of the netfilter APIs are exposed to userland applications. However, overhead of context switching between userland and the kernel may be too time consuming, particularly since the address remapper 850 may be expected to operate at close to an interface line-rate.

Figure 9:
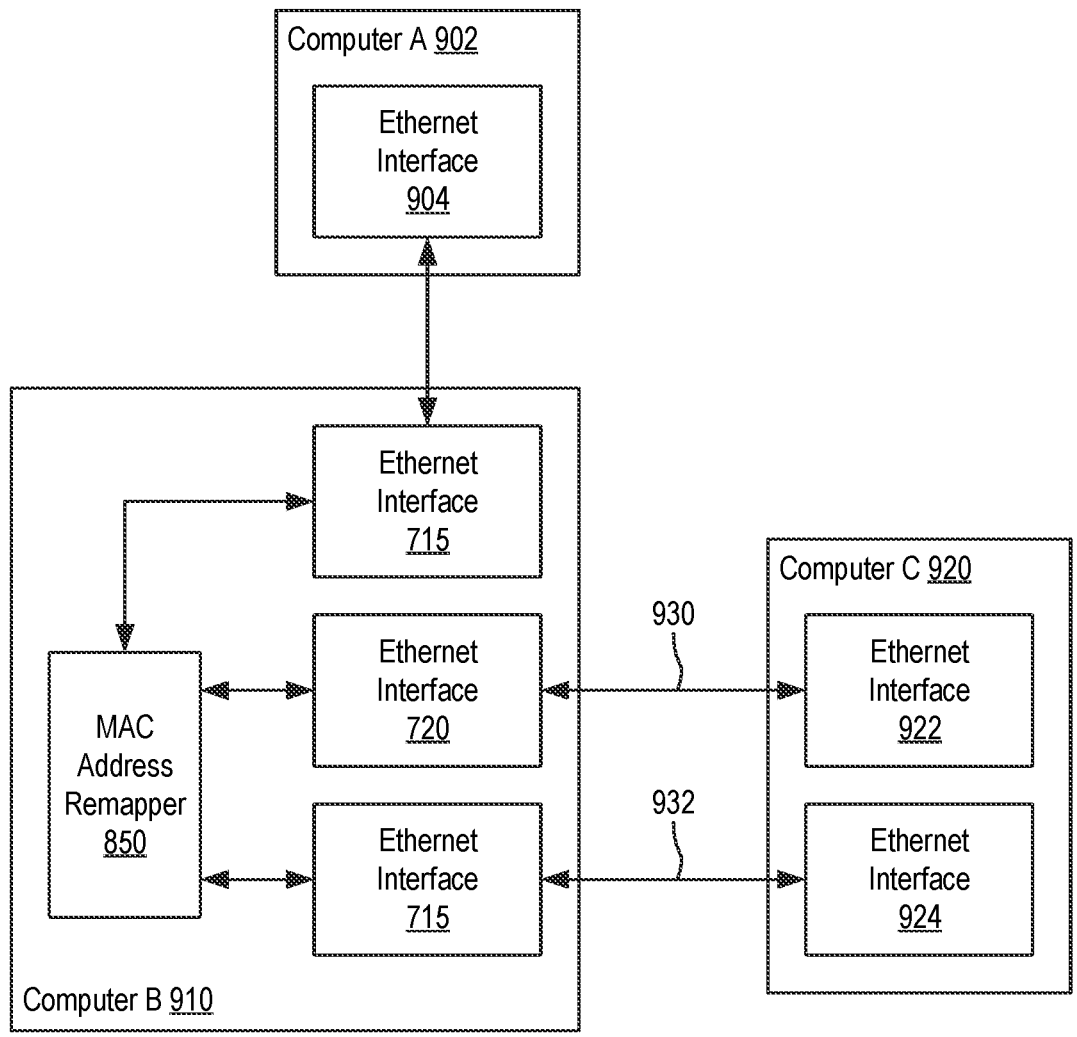
FIG. 9 is a block diagram illustrating exemplary operation of the address remapper of FIG. 8 within a multi-channel communications system, in embodiments.

FIG. 9 is a block diagram illustrating exemplary operation of address remapper 850 of FIG. 8 within a multi-channel communications system 900. The multi-channel communications system 900 includes a computer A 902 with an ethernet interface 904 (e.g., known as "eth0" on computer A), a computer B 910 with three Ethernet interfaces 715, 720, and 725 (e.g., "eth0", "eth1", and "eth2" on computer B— See also FIG. 10), and a computer C 920 with two Ethernet interfaces 922 and 924 (e.g., "eth0" and "eth1" on computer C). In the example of FIG. 9, computer B 910 operates as an Ethernet switch (e.g., operating as Linux OS bridge-based Ethernet interface 700 of FIG. 8 or as AP 220 of FIG. 2 where the Ethernet interfaces 720 and 725 represent radios 320 and 340) and also includes address remapper 850 (e.g., software executed by a processor of computer B 910).

Figure 10:
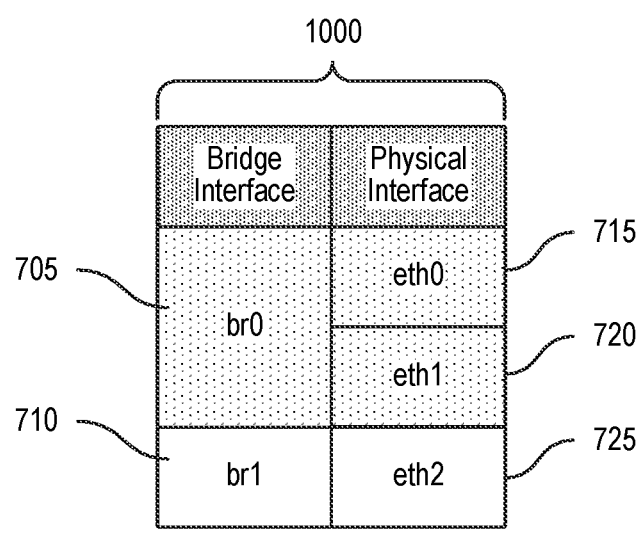
FIG. 10 is a block diagram illustrating one example bridge configuration of computer B of FIG. 9, in embodiments.

FIG. 10 is a block diagram illustrating one example bridge configuration 1000 of computer B 910 of FIG. 9. Configuration 1000 includes a first bridge "br0" 705 that connects with both ethernet interface 715 "eth0" and Ethernet interface 720 "eth1", and a bridge "br1" 710 that connects with Ethernet interface "eth2" 725. In certain embodiments, bridges 705 and 710 are each a "Linux bridge;" however, bridges 705 and 710 may be any similar bridge (e.g., software-based, or hardware-based) usable as described herein.

Ethernet interface 904 of computer A 902 is networked with Ethernet interface 715 of computer B 910, and Ethernet interfaces 720 and 725 of computer B 910 are networked with the Ethernet interfaces 922 and 924, respectively, of computer C 920. Accordingly, computer C 920 is a dual-channel device that, in this example, uses a single IP address (192.168.1.100), and is connected to computer B 910 via a primary channel 930 and a secondary channel 932. Each Ethernet interface 904, 715, 720, 922, and 924 has a unique MAC address. In the following examples, Ethernet interface 904 has a MAC address of 00:12:34:12:34:56, Ethernet interface 922 has a MAC address of 00:12:34:AA:BB:CC, and Ethernet interface 924 has a MAC address of 00:12:34:AA:BB:DD. Computer A 902 and computer C 920 may communicate with each other via computer B 910. Although computer C 920 has two Ethernet interfaces 922 and 924, logically, computer C 920 may use one IP address (192.168.1.100) for both Ethernet interface 922 and Ethernet interface 924. Further, since bridge "br0" 705 of computer B 910 is bridging "eth0" 612 and "eth1" 720 together, computer A 902 is aware only of MAC address "00:12:34:AA:BB:CC" of computer C 920, since Ethernet interface 922 connects to bridge "br0" 705 via Ethernet interface 720, whereas Ethernet interface 924 does not. Accordingly, computer A 902 addresses a UDP packet intended for computer C 920 using MAC address "00:12:34:AA:BB:CC."

If address remapper 850 were not present in computer B 910, or was not configured to remap MAC address "00:12:34:AA:BB:CC," an incoming Ethernet frame addresses to MAC address "00:12:34:AA:BB:CC" would be received by Ethernet interface "eth0" 715 and bridge "br0" 705 would forward the Ethernet frame to Ethernet interface "eth1" 720, from where it would be sent to Ethernet interface 922 of computer C 920.

Figure 11:
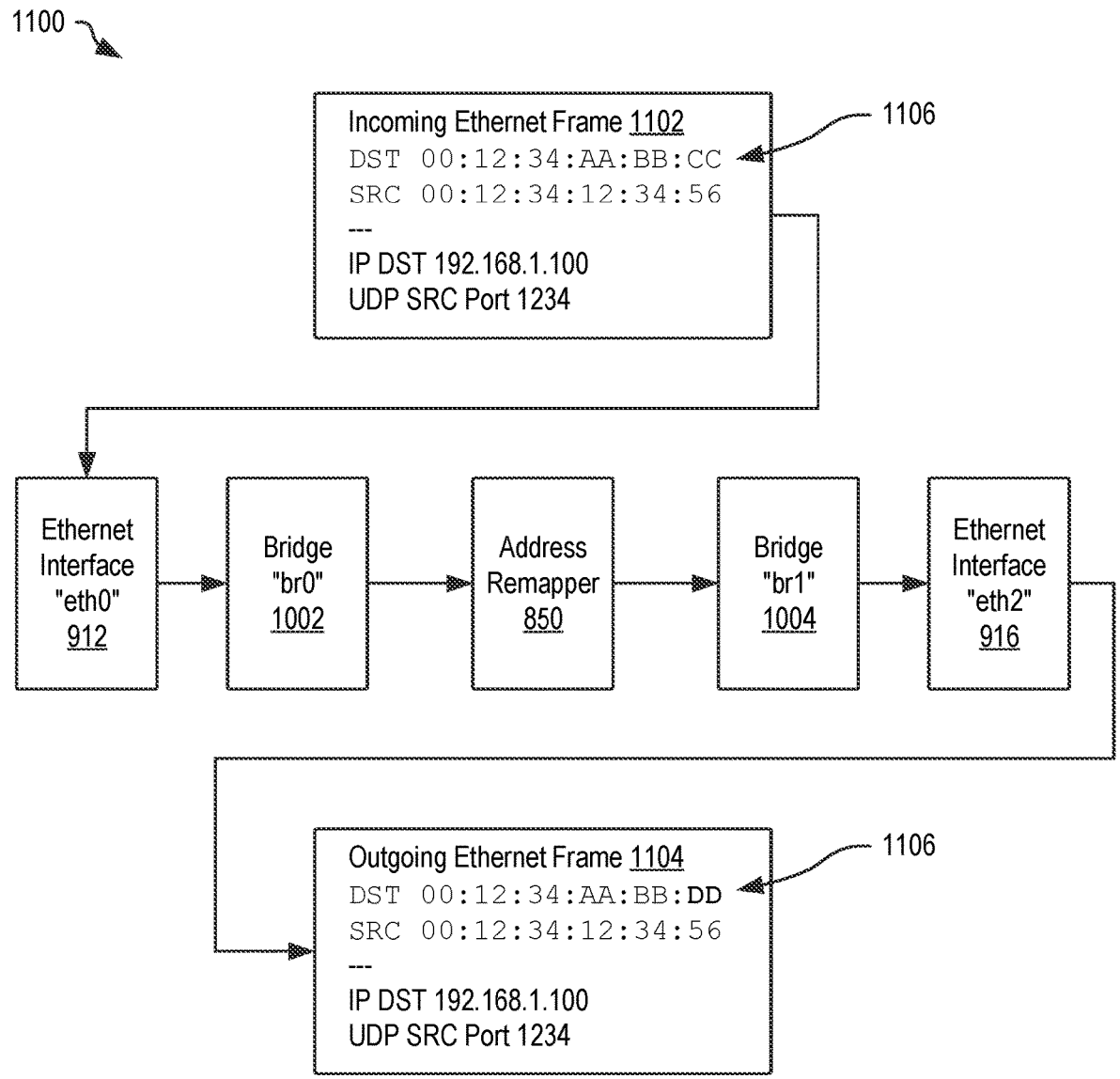
FIG. 11 is a data flow diagram illustrating example remapping of an incoming Ethernet frame by the address remapper of FIG. 8 within computer B of FIG. 9, in embodiments.

FIG. 11 is a data flow diagram illustrating example remapping 1100 of incoming Ethernet frame 1102 by address remapper 850 within computer B 910 of FIG. 9. FIG. 11 continues the example of FIGS. 8, 9, and 10, where rules 852 and filters 853 is configured to remap MAC address "00:12:34:AA:BB:CC" to MAC address "00:12:34:AA:BB:DD" conditionally when the incoming Ethernet frame also has a source port of 1234, thereby advantageously making use of secondary channel 932 for such matched incoming Ethernet frames.

As shown in FIG. 11, incoming Ethernet frame 1102 has a destination MAC address of "00:12:34:AA:BB:CC" and is from UDP source port 1234. Ethernet frame 1102 is received by Ethernet interface "eth0" 715 and passed to bridge "br0" 705. Address remapper 850 intercepts (e.g., using the netfilter API) Ethernet frame 1102 as it leaves bridge "br0" 705, and since the MAC address and source port match the conditions defined within rules 852 and filters 853, address remapper 850 modifies (remaps) the destination address to MAC address "00:12:34:AA:BB:DD" to form outgoing Ethernet frame 1104, which is then sent to Ethernet interface "eth2" 725, via bridge "br1" 710, for output to computer C 920. Computer A 902 is unaware of the address remapping and does not need to be aware. Advantageously, computer B 910 is able to make complex decisions to select a best physical path for traffic. For example, address remapper 850 may provide algorithmic load balancing based on a defined traffic filtering policy.

Various functions of address remapper 850 may be exposes to users. For example, the address remapper 850 is exposed to userland via the rules 852 and filters 853 (e.g., a "/proc/macremapctl" file). For example, a user may view a snapshot of a current configuration of address remapper 850 by viewing rules 852 and filters 853. Other operations to configure and control address remapper 850 are made using a system call (e.g., ioctl( ) on the rules 852 and filters 853. As is convention with Linux, more information about this API may be found in header files (e.g., macremapper ioctl.h and macremapper filter config.h) found in a source tree of address remapper 850, which is in the "user include" directory.

Rules 852 may include remap rules and filters 852 may include filters. Each filter defines a list of field match sets that are compared against incoming traffic (e.g., incoming Ethernet frame 1102) by address remapper 850. Filters do not perform matching at the OSI layer-2 level; only OSI layer-3 level and ISO layer-4 level. In certain embodiments, a single field match set may define any or all the following fields for matching against incoming Ethernet frames (e.g., incoming packets): Packet Minimum Size in Bytes, Single/Subnet/Range Source IP (v4 or v6) Address, Single/Range Source TCP and/or UDP Port, and Single/Range Destination TCP and/or UDP Port. If a field match set does not define any fields, then it will match everything, thus causing the filter to evaluate all values as true. Each remap rule may have one or more of the following parameters: match destination address; replace destination address (e.g., MAC address); filter; and bridge interface (e.g., being optional). For example, a destination MAC address of each frame that passes through address remapper 850 is checked against the "Match Destination MAC Address" parameter of each remap rule. If a match is found, the frame may be further inspected by evaluating it against the matching remap rule's filter. If and only if both the destination MAC address and filter are matched to the frame, is the frame remapped. A remap operation on a frame replaces its destination MAC address with the "Replace Destination MAC Address" parameter of the matching remap rule. In certain circumstances, such as in the example of FIGS. 9-11, a remap operation also includes a bridge identifier that causes address remapper 850 to route the matched frame to the identified bridge.

Address remapper 850 is designed to operate as quickly and efficient as possible, since it may evaluate and/or remap all network traffic leaving every bridge on the computer. Any bottleneck introduced by the address remapper 850 may degrade network performance. The address remapper 850 may use the Linux standard RCU locking design pattern to conform with high-performance SMP Linux applications. For example, the address remapper 850 is intended to operate at interface line-rate with rules 852 and filters 853 defining a reasonable number of filters and remap rules.

Figure 12:
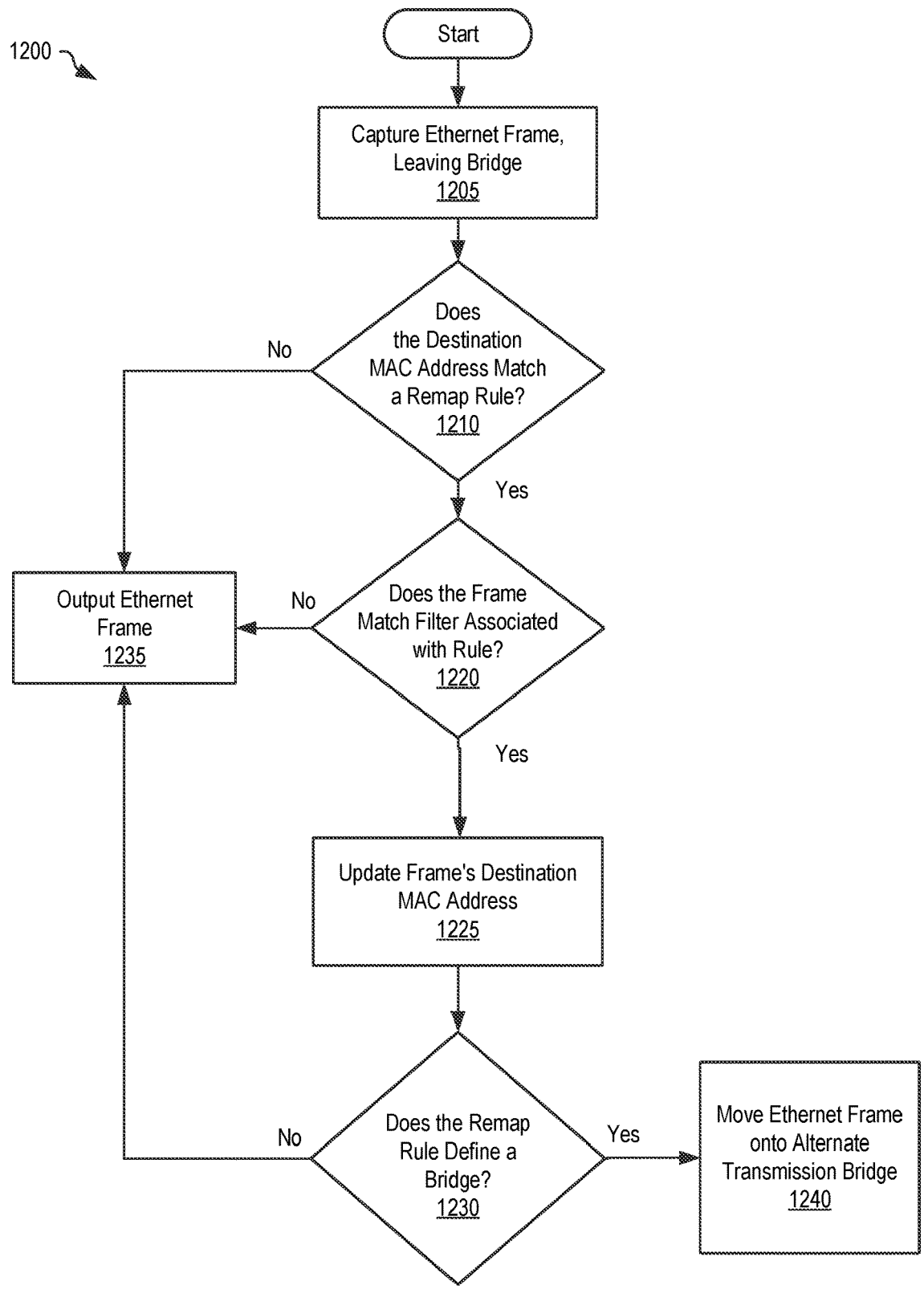
FIG. 12 is a flowchart illustrating one example method for address remapping implemented within the address remapper of FIG. 8, in embodiments.

FIG. 12 is a flowchart illustrating one example method 1200 for address remapping implemented within address remapper 850 of FIG. 8. Method 1200 may be used within multi-channel communications system 100 of FIG. 1, for example.

In block 1205, method 1200 captures an Ethernet frame leaving a bridge. In one example of block 1205, address remapper 850 captures incoming Ethernet frame 1102 as it leaves br0 705. Block 1210 is a decision. If, in block 1210, method 1200 determines that the destination MAC address matches a remap rule, method 1200 continues with block 1220; otherwise, method 1200 continues with block 1235. In one example of block 1210, address remapper 850 determines that the destination MAC address of Ethernet frame 1102 matches a rule within rules 852 and filters 853. Block 1220 is a decision. If, in block 1220, method 1200 determines that the frame matches the filter associated with the rule, method 1200 continues with block 1225; otherwise, method 1200 continues with block 1235. In one example of block 1220, address remapper 850 determines that the source port of Ethernet frame 1102 matches the source port defined within the rule matched in block 1210.

In block 1225, method 1200 updates the frame's destination MAC address. In one example of block 1225, address remapper 850 updates the destination MAC address 1106 of Ethernet frame 1102 to use the MAC address defined by the matched rule within rules 852 and filters 853 to form outgoing Ethernet frame 1104. Block 1230 is a decision. If, in block 1230, method 1200 determines that the remap rule defines a bridge, method 1200 continues with block 1240; otherwise, method 1200 continues with block 1235.

In block 1235, method 1200 outputs the Ethernet frame. In one example of block 1235, address remapper 850 outputs the incoming Ethernet frame 1102, unmodified, via Ethernet interface "eth1" 720. Method 1200 then returns to block 1205 to process the next Ethernet frame.

In block 1240, method 1200 moves the Ethernet frame onto an alternate transmission bridge. In one example of block 1240, address remapper 850 sends outgoing Ethernet frame 1104, as modified, to bridge "br1" 710. In this example, bridge 710 sends outgoing Ethernet frame 1104 to Ethernet interface 725. Address remapper 850 may intercept the outgoing Ethernet frame 1104 from bridge "br1" 710, and where the modified destination MAC address does not match any rules within rules 852 and filters 853, address remapper 850 allows the outgoing Ethernet frame 1104 to be output by Ethernet interface 725 to Ethernet interface 924 of computer C 920. Method 1200 repeats for each intercepted Ethernet frame.

Figure 13:
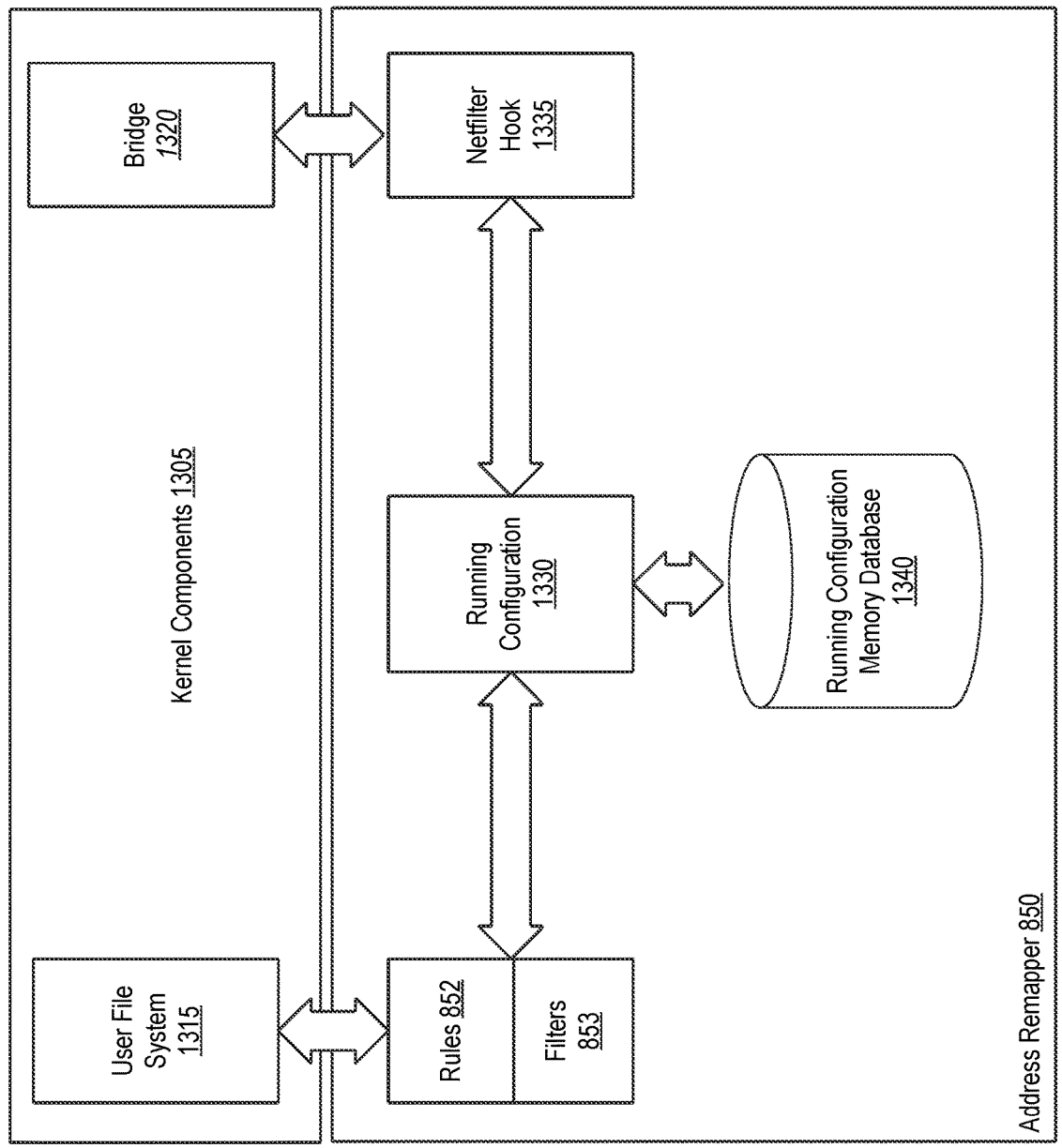
FIG. 13 is a block diagram illustrating one example implementation of the address remapper of FIG. 8 with Linux kernel components, in embodiments.

FIG. 13 is a block diagram illustrating one example implementation 1300 of address remapper 850 of FIG. 8 with Linux kernel components 1305. Kernel components 1305 include a user file system 1315 and at least one bridge 1320 (e.g., bridge 705 and/or bridge 710 of FIG. 10). Address remapper 850 may include rules 852 and filters 853, a running configuration 1330, a netfilter hook 1335, and a running configuration memory database 1340. Running configuration memory database 1340 manages memory allocation and concurrency control for memory in which running configuration 1330 is stored. The Linux RCU locking paradigm is used for optimal performance in Symmetric Multi-Processing (SMP) deployments. Running configuration 1330 abstracts and implements the configuration data-model used for all configurable parameters of address remapper 850. Running configuration memory database 1340 may store one or more running configurations 1330. Rules 852 and filters 853 may expose the configuration of address remapper 850 to userland (e.g., in user file system 1315). Netfilter hook 1335 interfaces with bridge 1320 and is used to process and manipulate the Ethernet traffic (e.g., frames and/or packets).

Link Aggregation Over Sd-Wan for 10G

Currently, 10G cannot be delivered to a home over a single coaxial cable and using a single modem. Currently, at best, a DOCSIS 3.1 modem delivers 3.5 gbps over four ports, each port delivering about 1G, and where the combined throughput is about 3.5G. This higher speed is achieved by including a network switch on the modem board and providing multiple output lanes. Currently, a single modem tunes two 192 MHz orthogonal frequency-division multiplexing (OFDM) channels, and the corresponding cable modem termination systems (CMTS), positioned at the cable company's headend, only outputs two 192 MHz OFDM channels per MAC-domain (e.g., per customer site). However, it is difficult to deliver a 10G service with a single modem. Most modems (e.g., DOCSIS 3.0) currently installed in homes typically deliver about 1 Gbps of download speed, where this 1 Gbps is divided across multiple (e.g., four) ethernet ports on the modem. A current goal is to provide a 10G service to a customer using existing infrastructure, thereby minimizing capital investment. The following embodiments provide a solution that allows an operator to deploy 10G services to existing customers quickly and cheaply.

On aspect of the present embodiments includes the realization that to deliver 10G to a customer, multiple modems are required. For example, using three or four cable modems, where each modem is capable of transferring 3.5 Gbps using two 192 MHz OFDM channels, these channels may be aggregated at either end of a CMTS and forced over a specific MAC-domain, to provide 10-14 Gbps of bandwidth over a single coax cable using 1.2-1.6 GHz of bandwidth.

Figure 14:
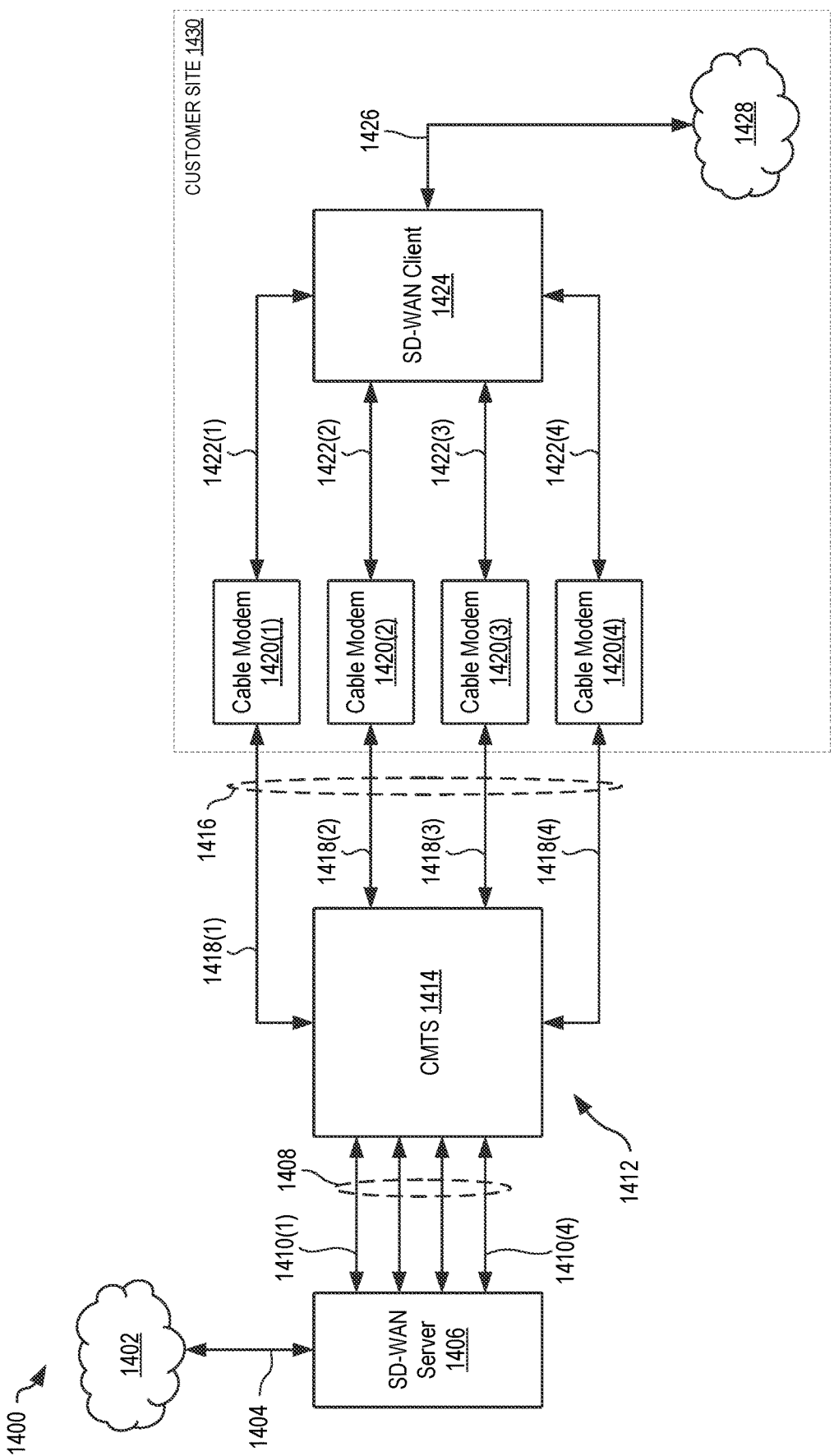
FIG. 14 is a schematic diagram illustrating one example provider system for delivering an aggregated 10G service over a single coaxial cable between the Internet and a customer network at a customer site, in embodiments.

FIG. 14 is a schematic diagram illustrating example provider system 1400 for delivering an aggregated 10G service over a single coaxial cable 1416 between Internet 1402 and a customer network 1428 at a customer site 1430. System 1400 may be used to deliver the 10G service between any two networks without departing from the scope hereof.

System 1400 includes a software-defined wide area network (SD-WAN) server 1406 that has a 10G, or faster, connection 1404 to Internet 1402. SD-WAN server 1406 is connected to a CMTS 1414, located at a headend 1412 for example, via a physical 10G link 1408 that may be configured as four, or more, 2.5G logical links 1410(1)-(4). For example, SD-WAN server 1406 may divide traffic received over 10G connection 1404 into the four logical links 1410(1)-(4). At headend 1412, a CMTS 1414 is configured to generate at least one MAC-domain (e.g., for customer site 1430) with four modem links 1418, where each modem link 1418 includes two 192 MHz (DOCSIS 3.1) OFDM channels. The modem links 1418(1)-(4) are output over a single coaxial cable 1416. In one embodiment, CMTS 1414 forms each modem link 1418 based on the received the logical links 1410. For example, each of the logical channels may be carried by two 192 MHz (DOCSIS 3.1) OFDM channels to form one of the modem links 1418. In other embodiments, CMTS 1414 determines allocation of traffic received over physical 10G link 1408 onto modem links 1418(1)-(4). In certain embodiments, CMTS 1414 may generate multiple (e.g., four) MAC-domains, each having two 192 MHz (DOCSIS 3.1) OFDM channels that are combined for output over single coaxial cable 1416.

At customer site 1430, single coaxial cable 1416 is input to four 2.5G+capable (DOCSIS 3.1) cable modems 1420 (1)-(4), where each cable modem 1420 is configured to receive two of the eight 192 MHz OFDM channels not received by other cable modems. Each cable modem 1420 (1)-(4) provides at least 2.5 Gbps over a respective Ethernet link 1422(1)-(4). At customer site 1430, an SD-WAN client 1424 aggregates the four Ethernet links 1422(1)-(4) into a single 10G downlink 1426 that connect to the customer network 1428.

Although system 1400 is shown with four cable modems 1420 that each receive two 192 MHz OFDM channels, thereby using eight 192 MHz OFDM channels, more or fewer cable modems 1420 may be used without departing from the scope hereof. For example, three cable modems 1420 using six 192 MHz OFDM channels may be used where each cable modem 1420 provides at least 3.4 Gbps, and five cable modems 1420 using ten 192 MHz OFDM channels may be used where each cable modem 1420 provides at least 2 Gbps. Although shown with a single Ethernet link 1422 between cable modem 1420 and SD-WAN client 1424, multiple Ethernet links may be used as need. For example, where cable modem 1420(1) delivers 3.4 Gbps throughput over four 1G Ethernet links, Ethernet link 1422(1) represents four physical Ethernet links.

In certain embodiments, functionality of system 1400 is combined within existing components. For example, cable modem 1420 may be configured with a gateway (with no splitter) and a router that determines how the outgoing traffic is divided up, and where CMTS determines which cable modem the traffic will use. However, the traffic over multiple cable modems 1420 is reassembled (aggregated) at each end of system 1400. For example, system 1400 may combine two 10 G links that are then conveyed over the 192 MHz OFDM channels. Although some new chips or software upgrades may be required in cable modems 1420, the solution of system 1400 provides a fast implementation without major infrastructure upgrades.

For example, a multiple-system operator (MSO) serving multi-unit dwellings or businesses that each require a service greater than 1G. Through use of system 1400, the MSO may deliver 10 Gbps+ to each customer site 1430 by aggregating multiple 192 MHz OFDM channels and/or DOCSIS MAC-domains. As described above, system 1400 is flexible, whereby the number of cable modems 1420, the number of modem links 1418, and/or the number of 192 MHz OFDM channels may be varies to suit the customer needs. For example, by using 3 or 4 cable modems, each capable of transferring the 3.5 Gbps of two 192 MHz OFDM channels, aggregated at either end of CMTS 1414, the customer is provided with 10-14 Gbps of bandwidth over a single coax cable using 1.2-1.6 GHz of bandwidth.

Figure 15:
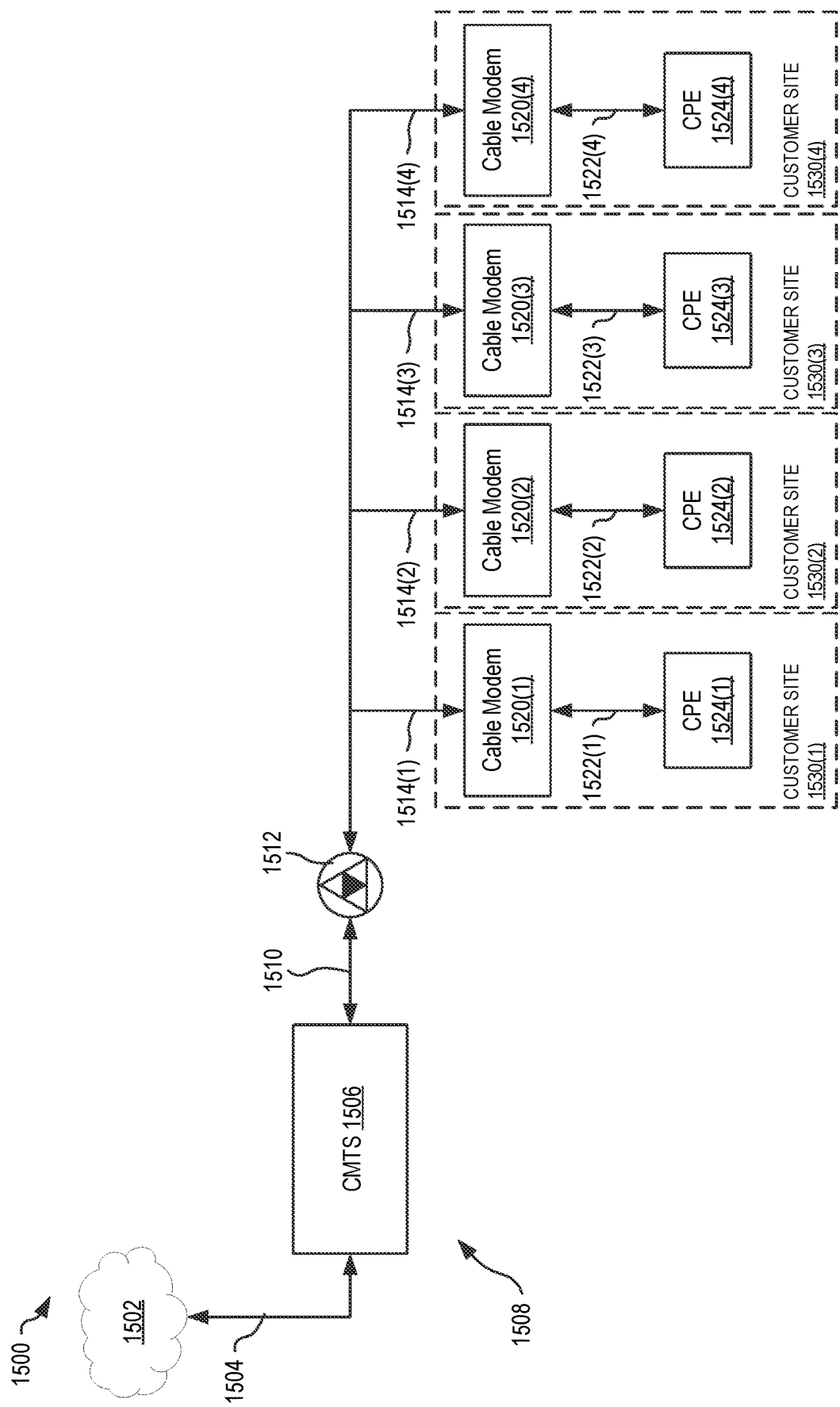
FIG. 15 is a schematic diagram illustrating one example provider system for delivering a 10G service to a CPE using a single cable modem, in embodiments.

FIG. 15 is a schematic diagram illustrating one example provider system 1500 for delivering a 10G service to a CPE 1524 using a single cable modem 1520. Since the 10G service is provided using a single cable modem 1520, system 1500 does not require aggregation of data, and therefore additional aggregation servers (e.g., SD-WAN server 1406 and SD-WAN client 1424 of FIG. 14) are not required.

System 1500 includes a CMTS 1506, located at a headend 1508 for example, that is connected with the Internet 1502 via at least one 100G connection 1504. CMTS 1506 generates a MAC-domain for each of a plurality of CPEs 1524, where each MAC-domain is allocated sufficient bandwidth (e.g., at least three 192 MHz OFDM channels) for the service, outputting the MAC-domain over an optical cable 1510. System 1500 also includes an optical node 1512 that taps the optical cable 1510 and generates, for the corresponding to MAC-domain, a modem signal on a coaxial cable 1514 that connects to a respective customer site 1530. At customer site 1530, a 10G capable cable modem 1520 converts the modem signal to at least one Ethernet link 1522 that connects to CPE 1524. As noted above, this solution is not currently available.

Figure 16:
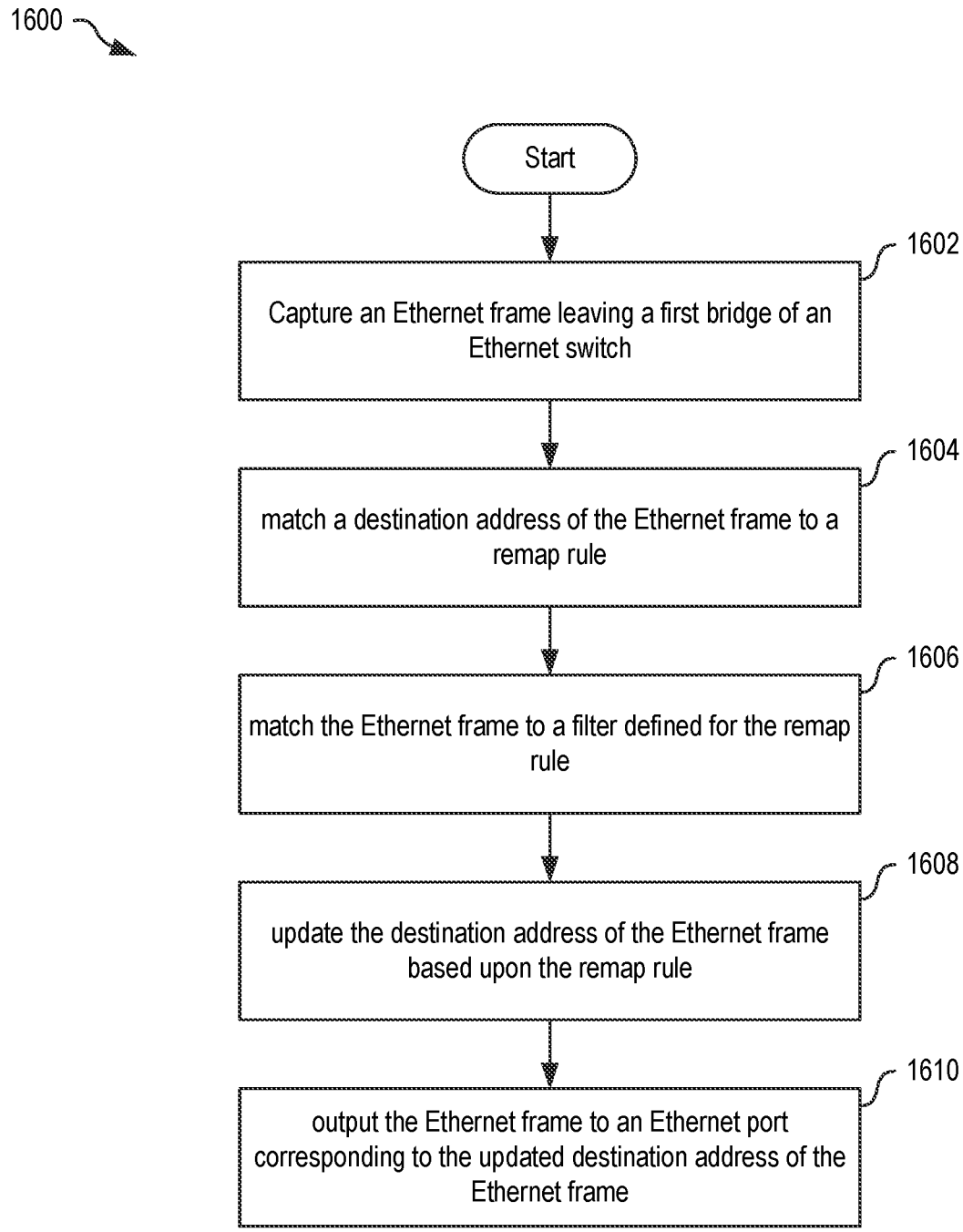
FIG. 16 is a flowchart illustrating one example method for multi-channel communications, in embodiments.

FIG. 16 is a flowchart illustrating one example method 1600 for multi-channel communications. Method 1600 is implemented in address remapper 850 of FIG. 8, for example.

In block 1602, method 1600 capture an Ethernet frame leaving a first bridge of an Ethernet switch. In one example of block 1602, address remapper 850 is invoked by netfilter hook 1335 as Ethernet frame 1102 leaves bridge "br0" 705. In block 1604, method 1600 matches a destination address of the Ethernet frame to a remap rule. In one example of block 1604, address remapper 850 compares a destination address 1106 of Ethernet frame 1102 to a destination MAC Address defined by each rule of rules 852 and filters 853, to determine a first rule that matches Ethernet frame 1102. In block 1606, method 1600 matches the Ethernet frame to a filter defined for the remap rule. In one example of block 1606, address remapper 850 matches other field of Ethernet frame 1102 to a filter corresponding to the matched rule of rules 852 and filters 853. In block 1608, method 1600 updates the destination address of the Ethernet frame based upon the remap rule. In one example of block 1608, address remapper 850 update destination address 1106 of Ethernet frame 1102, forming outgoing Ethernet frame 1104, with a replace destination MAC Address defined by the matched rule of rules 852 and filters 853. In block 1610, method 1600 outputs the Ethernet frame to an Ethernet port corresponding to the updated destination address of the Ethernet frame. In one example of block 1610, address remapper 850 moves outgoing Ethernet frame 1104 to bridge "br1" 710 for output to Ethernet interface "eth2" 725.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. An Ethernet switch for multi-channel communication, comprising:
 a processor;
 a first bridge; and
 memory storing non-transitory instructions that when executed by the processor cause the processor to:
  capture an Ethernet frame leaving a first bridge of the Ethernet switch;
  match a destination address of the Ethernet frame to a remap rule;
  match the Ethernet frame to a filter defined for the remap rule;
  generate an updated Ethernet frame from the Ethernet frame by updating the destination address based upon the remap rule; and
  output the updated Ethernet frame to an Ethernet port corresponding to the updated destination address of the Ethernet frame.

2. The Ethernet switch of claim 1, further comprising:
a second bridge; and
non-transitory instructions that when executed by the processor cause the processor to:
  determine, prior to outputting the Ethernet frame, a second bridge of the Ethernet switch is defined in the remap rule; and
  move, prior to outputting the Ethernet frame, the Ethernet frame to the second bridge.

3. The Ethernet switch of claim 2, wherein the remap rule defines a replace destination MAC Address for updating the destination address of the Ethernet frame and a bridge identifier that identifies the second bridge.

4. The Ethernet switch of claim 1, wherein the filter defines a UDP source port.

5. The Ethernet switch of claim 1, wherein the capturing is in response to a netfilter API call.

6. The Ethernet switch of claim 1, the remap rule and the filter being configurable to route traffic at an OSI model layer-4 level.

7. The Ethernet switch of claim 1, the filter having field match sets that defines values for comparison against fields of the Ethernet frame.

8. The Ethernet switch of claim 7, the filter being applied only at an OSI layer-3 level and an ISO layer-4 level.

9. The Ethernet switch of claim 7, the field match set defining at least one of: a packet minimum size, a single/subnet/range source IP (v4 or v6) address, a single/range source TCP port, a single/range source UDP Port, a single/range destination TCP port, and a single/range destination UDP Port.

10. The Ethernet switch of claim 1, wherein the Ethernet frame is updated only when both the destination address and the filter are matched to the Ethernet frame.

11. A method for multi-channel communication, comprising:
  capturing, in an Ethernet switch, an Ethernet frame leaving a first bridge of the Ethernet switch;
  matching a destination address of the Ethernet frame to a remap rule;
  matching the Ethernet frame to a filter defined for the remap rule;
  updating the destination address of the Ethernet frame based upon the remap rule; and
  outputting the Ethernet frame to an Ethernet port corresponding to the updated destination address of the Ethernet frame.

12. The method of claim 11, further comprising:
  determining, prior to outputting the Ethernet frame, a second bridge of the Ethernet switch is defined in the remap rule; and
  moving, prior to outputting the Ethernet frame, the Ethernet frame to the second bridge.

13. The method of claim 12, wherein the remap rule defines a destination MAC Address for updating the destination address of the Ethernet frame and a bridge identifier that identifies the second bridge.

14. The method of claim 11, wherein the filter defines a UDP source port.

15. The method of claim 11, wherein the capturing is in response to a netfilter API call.

16. The method of claim 11, the remap rule and the filter being configurable to route traffic at an OSI model layer-4 level.

17. The method of claim 11, the filter having field match sets that defines values for comparison against fields of the Ethernet frame.

18. The method of claim 17, the filter being applied only at an OSI layer-3 level and an ISO layer-4 level.

19. The method of claim 17, the field match set defining at least one of: a packet minimum size, a single/subnet/range source IP (v4 or v6) address, a single/range source TCP port, a single/range source UDP Port, a single/range destination TCP port, and a single/range destination UDP Port.

20. The method of claim 11, wherein the Ethernet frame is updated only when both the destination address and the filter are matched to the Ethernet frame.

* * * * *